(12) United States Patent
Michael

(10) Patent No.: US 12,719,246 B2
(45) Date of Patent: Aug. 25, 2026

(54) CABLE HANGER

(71) Applicant: SHOALS TECHNOLOGIES GROUP, LLC, Portland, TN (US)

(72) Inventor: Dorothy Michael, Greenbrier, TN (US)

(73) Assignee: SHOALS TECHNOLOGIES GROUP, LLC, Portland, TN (US)

( * ) Notice: Subject to any disclaimer, the term of this patent is extended or adjusted under 35 U.S.C. 154(b) by 47 days.

(21) Appl. No.: 18/646,517

(22) Filed: Apr. 25, 2024

(65) Prior Publication Data

US 2024/0348026 A1 Oct. 17, 2024

Related U.S. Application Data

(63) Continuation-in-part of application No. 29/916,429, filed on Nov. 10, 2023, now Pat. No. Des. 1,118,325,
(Continued)

(51) Int. Cl.
*F16L 3/00* (2006.01)
*F16L 3/02* (2006.01)
(Continued)

(52) U.S. Cl.
CPC .............. *H02G 3/0456* (2013.01); *F16L 3/02* (2013.01); *H02S 20/32* (2014.12); *H02S 40/30* (2014.12)

(58) Field of Classification Search
None
See application file for complete search history.

(56) References Cited

U.S. PATENT DOCUMENTS 1,982,501 A 11/1934 Douglas
D188,323 S 7/1960 Johnson
(Continued)

FOREIGN PATENT DOCUMENTS

CN 102339870 A 2/2012
EP 1681391 A1 7/2006
(Continued)

OTHER PUBLICATIONS

International Search Report and Written Opinion for International Application No. PCT/US2022/027478 mailed Sep. 2, 2022, 9 pgs.
(Continued)

*Primary Examiner* — Steven M Marsh
(74) *Attorney, Agent, or Firm* — Panitch Schwarze Belisario & Nadel LLP

(57) ABSTRACT

In an example, a cable hanger includes a body and an upper portion. The body defines a cable retention channel. The upper portion extends from the body and is configured to
(Continued)

suspend the cable hanger from structure of a solar array. In some embodiments, the upper portion includes a component retention clip having a base wall and two side walls that form a planar slot therebetween and the cable hanger further includes at least one grip element in the slot and coupled with at least one of the two side walls. In some embodiments, the upper portion is configured to indirectly suspend the cable hanger from the structure of the solar array and the upper portion includes a cable hanger slide-coupling element configured to couple with a discrete component retention clip that is couplable to the structure of the solar array.

9 Claims, 16 Drawing Sheets

Related U.S. Application Data and a continuation-in-part of application No. 18/184,474, filed on Mar. 15, 2023, now Pat. No. 12,158,229.

(60) Provisional application No. 63/498,242, filed on Apr. 25, 2023, provisional application No. 63/322,102, filed on Mar. 21, 2022.

(51) Int. Cl.

| | |
|---|---|
| ***H02G 3/04*** | (2006.01) |
| ***H02S 20/32*** | (2014.01) |
| ***H02S 40/30*** | (2014.01) |

(56) References Cited

U.S. PATENT DOCUMENTS

| | | | |
|---|---|---|---|
| 3,053,930 A | 9/1962 | Mallanik et al. | |
| 3,136,515 A | 6/1964 | Potruch | |
| 3,233,851 A | 2/1966 | Lemieux | |
| 3,353,567 A | 11/1967 | Isreeli | |
| 3,564,668 A | 2/1971 | Kirk | |
| 3,601,756 A | 8/1971 | Stroh | |
| D269,851 S | 7/1983 | Kimura | |
| 4,669,156 A | 6/1987 | Guido et al. | |
| D296,074 S | 6/1988 | Seyfarth | |
| D297,813 S | 9/1988 | Marx | |
| D331,698 S | 12/1992 | Pezzoli | |
| D332,401 S | 1/1993 | Araujo, Jr. | |
| 5,331,725 A | 7/1994 | Chou | |
| D363,211 S | 10/1995 | Noble | |
| D375,890 S | 11/1996 | Takai | |
| D376,309 S | 12/1996 | Takai | |
| 5,613,655 A | 3/1997 | Marion | |
| 5,615,852 A | 4/1997 | Heidorn et al. | |
| D379,060 S | 5/1997 | Laga | |
| D387,652 S | 12/1997 | Carlson, Jr. | |
| D406,383 S | 3/1999 | Adams | |
| 6,227,502 B1 | 5/2001 | Derman | |
| 6,405,414 B1 | 6/2002 | Byrnes | |
| D463,127 S | 9/2002 | Haertzen | |
| 6,477,744 B1 | 11/2002 | Miles | |
| D482,269 S | 11/2003 | Martello | |
| 6,802,480 B1 | 10/2004 | Martello | |
| D503,926 S | 4/2005 | Marrs | |
| D510,015 S | 9/2005 | Hostetler | |
| 7,162,836 B2 | 1/2007 | Van Straaten | |
| D568,254 S | 5/2008 | Patchett | |
| D581,255 S | 11/2008 | Calvin | |
| D584,132 S | 1/2009 | Judd | |
| 7,592,546 B2 | 9/2009 | Johansson | |
| 7,635,108 B2 * | 12/2009 | Zeuner | H02G 3/30 248/65 |
| D637,473 S | 5/2011 | Mitchell | |
| D640,527 S | 6/2011 | Hoek | |
| D646,556 S | 10/2011 | Kelleghan | |
| D657,869 S | 4/2012 | Mammen | |
| D660,690 S | 5/2012 | Mixides | |
| 8,534,625 B2 * | 9/2013 | Heath | F16B 2/06 248/65 |
| D704,594 S | 5/2014 | Cherin | |
| 8,840,071 B2 | 9/2014 | Oh et al. | |
| D728,349 S | 5/2015 | Lake | |
| D729,619 S | 5/2015 | Cherin | |
| D731,296 S | 6/2015 | Nelson | |
| D732,422 S | 6/2015 | Fildan | |
| D733,534 S | 7/2015 | Altrichter | |
| D753,260 S | 4/2016 | Solovov, Jr. | |
| D755,043 S | 5/2016 | Bailey | |
| D755,529 S | 5/2016 | Schlang | |
| D784,798 S | 4/2017 | Logsdon | |
| D791,558 S | 7/2017 | Carpio | |
| D799,314 S | 10/2017 | Adams, IV | |
| D803,164 S | 11/2017 | Noble | |
| D803,165 S | 11/2017 | Noble | |
| 9,903,511 B2 | 2/2018 | Vermillion | |
| D811,690 S | 3/2018 | Berte | |
| D815,982 S | 4/2018 | Chang | |
| D818,391 S | 5/2018 | Chang | |
| D818,392 S | 5/2018 | Chang | |
| D824,800 S | 8/2018 | Blume | |
| D840,795 S | 2/2019 | Tribbett | |
| D845,168 S | 4/2019 | Paik | |
| D848,899 S | 5/2019 | Chang | |
| D849,516 S | 5/2019 | Johnson | |
| 10,433,926 B2 | 10/2019 | Recanati | |
| D896,695 S | 9/2020 | Falvai | |
| D899,237 S | 10/2020 | Peck | |
| D906,790 S | 1/2021 | Ng | |
| 10,978,861 B2 | 4/2021 | Garrett et al. | |
| D928,311 S | 8/2021 | McVaney | |
| D930,448 S | 9/2021 | Parker et al. | |
| D932,007 S | 9/2021 | Moudy | |
| D935,349 S | 11/2021 | Camerlengo | |
| D942,256 S | 2/2022 | Christiansen | |
| 11,236,858 B1 | 2/2022 | Rigby | |
| D945,379 S | 3/2022 | Allender-Zivic | |
| D945,865 S | 3/2022 | Arnold | |
| D957,919 S | 7/2022 | Bredl | |
| D968,944 S | 11/2022 | Liu | |
| D970,455 S | 11/2022 | Xiao | |
| D974,879 S | 1/2023 | Wu | |
| D975,030 S | 1/2023 | Atwood | |
| D976,690 S | 1/2023 | Peng | |
| D977,949 S | 2/2023 | Li | |
| D979,555 S | 2/2023 | Chen et al. | |
| D981,823 S | 3/2023 | Hongmeng | |
| D981,825 S | 3/2023 | Hu | |
| D991,780 S | 7/2023 | Michael et al. | |
| D996,373 S | 8/2023 | Michael et al. | |
| D997,106 S | 8/2023 | Michael | |
| D997,886 S | 9/2023 | Michael | |
| D997,887 S | 9/2023 | Michael | |
| D997,888 S | 9/2023 | Michael | |
| 11,949,373 B1 | 4/2024 | Jasmin et al. | |
| D1,059,156 S | 1/2025 | Limber | |
| D1,071,707 S | 4/2025 | Truesdell et al. | |
| D1,088,838 S | 8/2025 | Yoon et al. | |
| D1,092,187 S | 9/2025 | Guilford | |
| D1,102,878 S | 11/2025 | Hodsdon | |
| 2003/0061690 A1 | 4/2003 | Finley et al. | |
| 2004/0118798 A1 | 6/2004 | Spiers et al. | |
| 2005/0120652 A1 | 6/2005 | Cacciani et al. | |
| 2009/0094799 A1 | 4/2009 | Ashel | |
| 2009/0293233 A1 | 12/2009 | Ho et al. | |
| 2011/0260011 A1 | 10/2011 | Yu et al. | |
| 2012/0192925 A1 | 8/2012 | Grushkowitz | |
| 2014/0053891 A1 | 2/2014 | West et al. | |
| 2014/0061396 A1 | 3/2014 | Magno et al. | |
| 2014/0326838 A1 | 11/2014 | West et al. | |
| 2014/0353435 A1 | 12/2014 | Liu et al. | |
| 2014/0374544 A1 | 12/2014 | Pearson et al. | |
| 2015/0219248 A1 | 8/2015 | Lares | |
| 2015/0276093 A1 | 10/2015 | Aotani | |
| 2016/0091116 A1 | 3/2016 | Shoecraft et al. | |
| 2016/0111996 A1 | 4/2016 | Stephan et al. | |

(56) References Cited

U.S. PATENT DOCUMENTS

2016/0258554 A1 9/2016 Rippol
2016/0282018 A1 9/2016 Ash
2018/0019703 A1 1/2018 Almy
2018/0080579 A1 3/2018 Costigan
2018/0366926 A1 12/2018 Schulte
2019/0081469 A1 3/2019 Shea et al.
2019/0149087 A1 5/2019 McPheeters et al.
2020/0107466 A1 4/2020 Hjelmfelt et al.
2020/0366076 A1 11/2020 Naugler et al.
2020/0403390 A1 12/2020 Jette
2021/0033220 A1 2/2021 Laughlin
2021/0184325 A1 6/2021 Wu
2021/0213231 A1 7/2021 Spear
2021/0344179 A1 11/2021 Mourieras
2022/0356963 A1 11/2022 Michael et al.
2022/0359102 A1 11/2022 Michael
2022/0360059 A1 11/2022 Michael et al.
2023/0245798 A1 8/2023 Michael et al.
2023/0296192 A1 9/2023 Michael et al.
2024/0305077 A1* 9/2024 Peck ...................... H02G 3/263
2024/0348026 A1 10/2024 Michael

FOREIGN PATENT DOCUMENTS

EP 2766966 B1 1/2016
GB 2464680 A 4/2010
WO 2018032033 A1 2/2018
WO 2022235679 A1 11/2022

OTHER PUBLICATIONS

International Search Report and Written Opinion for International Application No. PCT/US2022/027483 mailed Aug. 16, 2022, 8 pgs.

Invitation to pay fees for International Application No. PCT/US2022/027792 mailed Aug. 1, 2022, 2 pgs.

International Search Report and Written Opinion for International Application No. PCT/US2022/027792 mailed Oct. 5, 2022, 11 pgs.

Invitation to pay fees for International Application No. PCT/US2023/015303 mailed May 22, 2023, 2 pgs.

International Search Report and Written Opinion for International Application No. PCT/US2023/015303 mailed Jul. 28, 2023, 13 pgs.

International Search Report and Written Opinion for International Application No. PCT/US2023/017566 mailed Jun. 27, 2023, 9 pgs.

International Search Report and Written Opinion mailed Sep. 17, 2024, in PCT Application No. PCT/US2024/026319.

International Search Report and Written Opinion for International Application No. PCT/US2024/026319 mailed Sep. 12, 2024, 14 pgs.

Examination Report for Australian Application No. 2022268921 mailed Aug. 2, 2024, 3 pgs.

Examination Report for Australian Application No. 2022268964 mailed Oct. 30, 2024, 3 pgs.

Examination Report for Australian Application No. 2022269586 mailed Aug. 5, 2024, 3 pgs.

Extended European Search Report issued Feb. 17, 2026 in EP Application No. 23775474.2.

* cited by examiner 126
134
306
316
302
310
308
304
$w_2$
$h_2$
$h_1$
$w_1$
314
312
318

CABLE HANGER

CROSS-REFERENCE TO RELATED APPLICATION

This application claims the benefit of and priority to U.S. Provisional App. No. 63/498,242 filed Apr. 25, 2023. This application is also a continuation-in-part of U.S. application Ser. No. 29/916,429 filed Nov. 10, 2023 and U.S. application Ser. No. 18/184,474 filed Mar. 15, 2023 which claims the benefit of and priority to U.S. Provisional App. No. 63/322,102 filed Mar. 21, 2022. Each of the 63/498,242, 29/916,429, 18/184,474, and 63/322,102 applications are incorporated herein by reference in their entirety.

FIELD

The embodiments discussed in the present disclosure are related to a cable hanger.

BACKGROUND

Solar power has long been considered a niche utility. It is considered desirable from an environmental and political standpoint, but perhaps not economically feasible for generating enough power to make a meaningful contribution to the grid. However, as the problems associated with our dependence on fossil fuels have become better understood, more attention has been paid to so-called alternative energy such as solar power. This attention has led to significant technological and policy advances, such that solar power is now quite prevalent, and more economically feasible.

Technological advances in the generation of solar energy have occurred in multiple areas, including collector material and structure, and wiring infrastructure. Wiring infrastructure, however, continues to present challenges, particularly in large scale solar photovoltaic (PV) panel array installations. Proper wire management is vital to the health of the PV system. Damaged wire insulation can lead to ground-faults, system downtime and fire. Moreover, PV systems are installed in various geographic locations, and experience extreme weather and environmental conditions. The wiring infrastructure must defy wind and weather conditions for many years and must reliably safeguard various electricity yields. The sheer number of cables associated with a typical PV array installation adds to the difficulty in providing efficient and effective wire management. The cables employed to convey electricity to or from a PV system may be referred to as electrical cables.

Long cable runs between structural elements (e.g., structural piles) can put a significant structural strain on the electrical cables if the electrical cables support their own weight. One solution to avoid such strain on the electrical cables is to use messenger cable (or messenger wire) essentially as a backbone to support the electrical cables. For example, the messenger cable may extend between structural elements with the electrical cables suspended from the messenger cable at numerous locations between the structural elements to reduce mechanical strain at any one location of the electrical cables.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

This Summary is provided to introduce a selection of concepts in a simplified form that are further described below in the Detailed Description. This Summary is not intended to identify key features or essential characteristics of the claimed subject matter, nor is it intended to be used to limit the scope of the claimed subject matter.

Some embodiments of the present disclosure address the problems experienced in other PV systems in which cables in PV systems need to be supported in such a way as to avoid strain. Embodiments herein accomplish the foregoing with or without messenger cables using cable hangers that hang, directly or indirectly, from torsion tubes or other structure of a tracker array or other solar array to suspend cables below the torsion tubes or other structure. Some embodiments of the cable hangers are of sufficient length to suspend the cables well below the torsion tubes or other structure to avoid, or at least reduce the likelihood, of the cables becoming tangled with the system as the torsion tubes rotate throughout the day during solar tracking. Other embodiments may be clipped virtually anywhere along the vertical height of the structure (e.g., of an H-pile or I-pile or other structure) and/or may be modular for increased versatility in selecting a desired orientation.

In an example, a cable hanger includes a body and an upper portion. The body defines a cable retention channel. The upper portion extends from the body and is configured to suspend the cable hanger from structure of a tracker array.

In another example, a cable hanger includes a body, an upper portion, and a grip element. The body defines a cable retention channel. The upper portion extends from the body and includes a component retention clip having a base wall and two side walls that form a slot therebetween. The grip element is disposed in the slot and is coupled with at least one of the two side walls.

In another example, a cable hanger system includes a cable hanger and a component retention clip. The cable hanger includes a body and an upper portion. The body defines a cable retention channel. The upper portion extends from the body and includes a cable hanger slide-coupling element configured to couple with the component retention clip that is couplable to structure of a solar array. The component retention clip includes a body, a grip element, and at least two clip slide-coupling elements. The body has a base wall and two side walls forming a slot therebetween. The grip element is in the slot and is coupled with at least one of the two side walls. The at least two clip slide-coupling elements are on an outer surface of at least one of the two side walls and each is configured to independently couple with the cable hanger slide-coupling element of the cable hanger. Each clip slide-coupling element has a tapered cross-sectional profile in a longitudinal plane that narrows in a sliding axis towards an edge of the respective side wall and has a trapezoidal cross-sectional profile in a lateral plane that is orthogonal with the longitudinal plane. The at least two clip slide-coupling elements include a first clip slide-coupling element having a first longitudinal plane in a first sliding axis and a second clip slide-coupling element having a second longitudinal plane in a second sliding axis that is at an angle with the first sliding direction.

The object and advantages of the embodiments will be realized and achieved at least by the elements, features, and combinations particularly pointed out in the claims. Both the foregoing summary and the following detailed description are exemplary and explanatory and are not restrictive.

BRIEF DESCRIPTION OF THE DRAWINGS

Example embodiments will be described and explained with additional specificity and detail through the use of the accompanying drawings in which:

FIGS. 3A-3D illustrate an example cable hanger of FIG. 1;

all according to at least one embodiment described in the present disclosure.

DETAILED DESCRIPTION

Some embodiments herein relate to various cable hangers that may be used to suspend cables from a tracker array. The cable hangers may take any of a variety of forms for use in any one of various circumstances. In general, each cable hanger may include a body that defines one or more cable retention channels and an upper portion that extends from the body and that is configured to suspend the cable hanger, either directly or indirectly, from structure of the tracker array. In an example, the upper portion may be elongate and/or may include a hook to hang the cable hanger from a torsion tube or other structure. In another example, the upper portion may include a component retention clip with a planar slot and one or more grip elements coupled to the component retention clip within the planar slot. The component retention clip and the grip elements may cooperate to couple the cable hanger to a planar portion of the tracker array structure received within the planar slot. The planar portion of the tracker array structure may include, for instance, the flange of, e.g., an H-pile or an I-pile. In another example, the upper portion may include a hanger slide coupling element independently coupleable to any one of multiple complementary clip slide coupling elements of a discrete component retention clip. Similar to the example in which the upper portion of the cable hanger includes the component retention clip, the discrete component retention clip may have a planar slot and one or more grip elements may be coupled to the component retention clip within the planar slot where the component retention clip and the one or more grip elements cooperate to couple the component retention clip, and thereby indirectly the cable hanger, to a planar portion of the tracker array structure received within the planar slot.

Embodiments of the present disclosure will be explained with reference to the accompanying figures. It is to be understood that the figures are diagrammatic and schematic representations of such example embodiments, and are not limiting, nor are they necessarily drawn to scale. In the figures, features with like numbers indicate like structure and function unless described otherwise.

Figure 1:
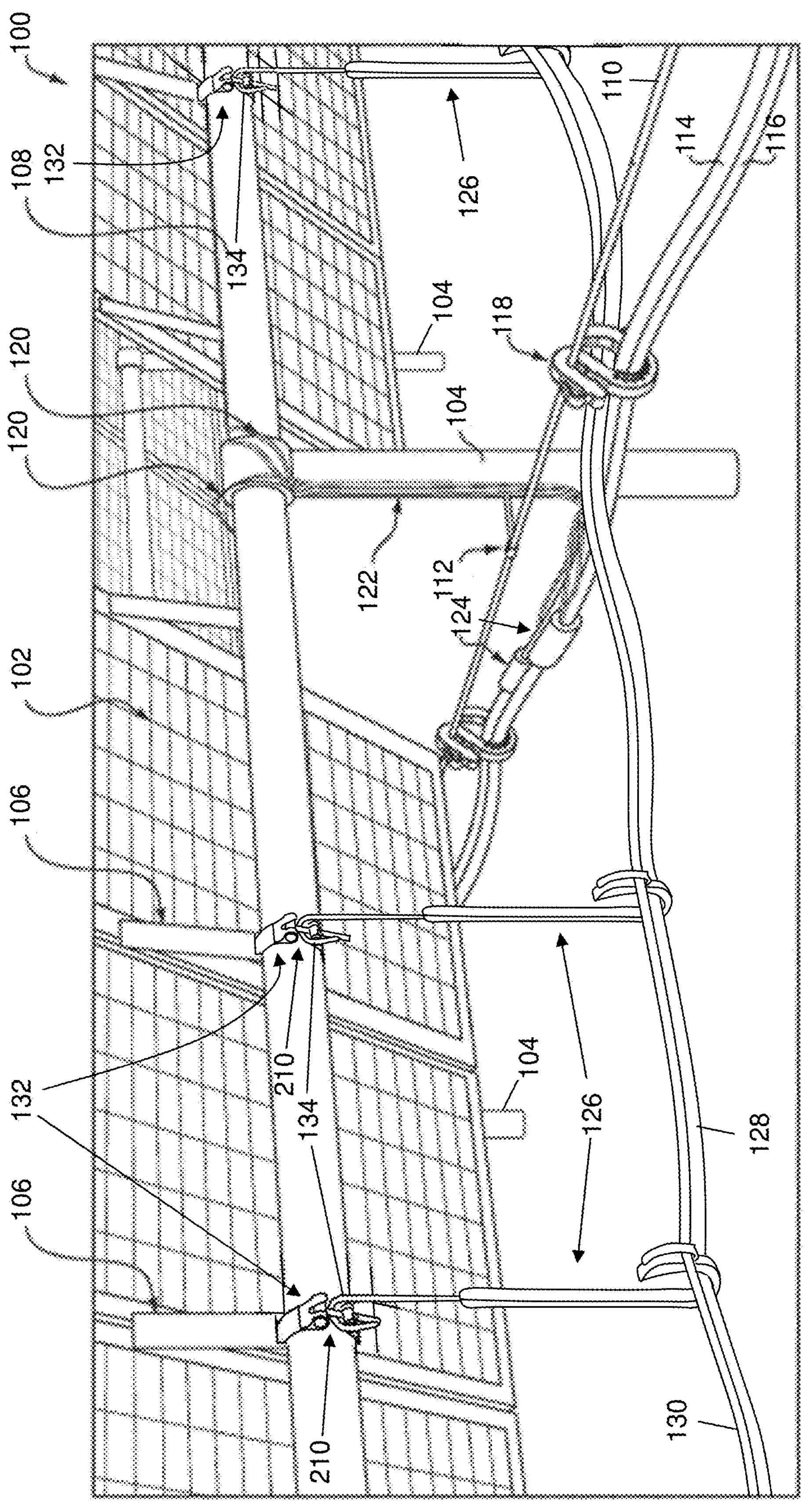
FIG. 1 shows an example solar infrastructure.

FIG. 1 shows an example solar infrastructure 100, arranged in accordance with at least one embodiment herein. As illustrated, the solar infrastructure 100 supports multiple solar panels 102 using piles 104 of the solar infrastructure 100. In particular, the solar panels 102 are mounted to frames 106, the frames 106 are mounted to and supported by torque tubes 108, and the torque tubes 108 are mounted to and supported by the piles 104 for an above ground installation, the frames 106 and torque tubes 108 being part of the solar infrastructure 100. The piles 104 may be installed in, on, coupled to, etc. the ground or other surface, structure, or the like. The pile 104 is illustrated as a round pile (e.g., a pile having a cross-section perpendicular to its length in the shape of a circle, ellipse, or the like) but more generally may have any shape or configuration, such as an I-pile or H-pile (e.g., a pile having a cross-section perpendicular to its length in the shape of an I or H with two parallel flanges coupled by a web), an octagonal pile (e.g., a pile having a cross-section perpendicular to its length in the shape of an octagon), or other shape or configuration.

The solar infrastructure 100 may additionally include a messenger cable or wire 110 mounted via a messenger cable clamp 112 to the pile 104. One or more big lead assembly (BLA) cables (e.g., a positive BLA cable and a negative BLA cable) 114, 116 or other cables or wires hang from the messenger cable 110. Messenger cable hangers 118 hang from the messenger cable 110 to carry or support the BLA cables 114, 116. The BLA cables 114, 116 may be trunk cables or lead cables that carry the electricity from a group of solar panels 102 to a central component. The BLA cables 114, 116 are suspended from the messenger cable 110. A first branch cable 120 (e.g., positive) and a second branch cable 122 (e.g., negative) run between the solar panel 102 and the BLAS 114, 116 and electrically couple the solar panel 102 to the BLAs 114, 116. Junction connectors 124 connect the first branch cable 120 to the BLA cable 116 and the second branch cable 122 to the BLA cable 114. As shown, the messenger cable 110 structurally supports the BLA cables 114, 116, e.g., to reduce mechanical stress or strain on the BLA cables 114, 116.

Instead of or in addition to the messenger cable 110 supporting BLA cables 114, 116, the solar infrastructure 100 may include tracker array cable hangers 126 (hereinafter "cable hangers 126") to suspend one or more cables 128, 130, e.g., below the torque tubes 108. The cables 128, 130 may include one or more BLA cables 128 (e.g., trunk cables, lead cables) (only one of which is visible in FIG. 1) and one or more other cables 130. The other cables 130 may include cables for, e.g., communication, sensing, control, or other purposes. Some or all of the cables 128, 130 may be implemented instead of or in addition to the BLA cables 114, 116. Although not illustrated in FIG. 1, one or more branch cables (e.g., instead of the branch cables 120, 122) may electrically couple the solar panels 102 to the BLA cables 128.

Figure 2:
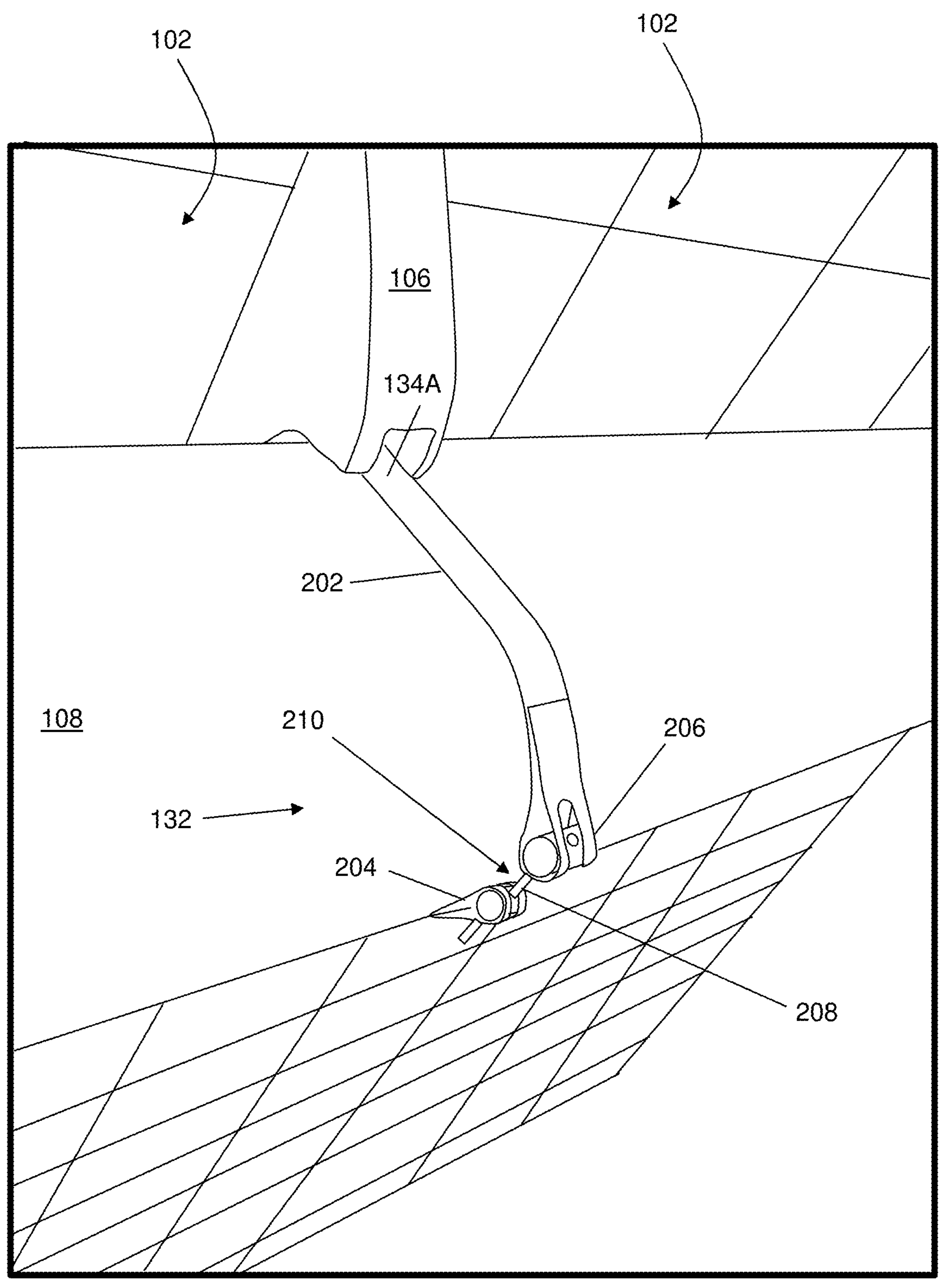
FIG. 2 illustrates a clamp on a torque tube of the solar infrastructure of FIG. 1.

In some embodiments, the frames 106 are mounted to the torque tubes 108 by clamps or brackets 132. FIG. 2 illustrates one of the clamps 132 on the torque tube 108 of FIG. 1, arranged in accordance with at least one embodiment herein. The cable hanger 126 has been omitted from FIG. 2 for simplicity. As illustrated in FIG. 2, the clamp 132 may be coupled to or included as part of the frame 106 and may have an adjustable diameter to clamp to the torque tube 108 and secure the frame 106 thereto.

In some embodiments, the clamp 132 includes a band 202 coupled to the frame 106, the band 202 having free ends 204, 206 extending towards each other. A bolt or other fastener 208 may be used to couple the free ends 204, 206 together. The free end 204 may define a threaded through hole with which the fastener 208 mates. In particular, with the fastener 208 extending from the free end 206 and threaded into the through hole of the free end 204, the fastener 208 may be screwed into the free end 204 until the clamp 132 is tightened on the torque tube 108, thereby securing the frame 106 to the torque tube 108. Other clamps and arrangements for securing the frames 106 to the torque tubes 108 are possible and the clamp 132 is merely provided as an example.

With the clamp 132 tightened on the torque tube 108, a gap 210 may be formed both between the free ends 204, 206 and between the fastener 208 and the torque tube 108. With combined reference to FIGS. 1A and 1B, a hooked end 134 of each of the cable hangers 126 may be inserted through a corresponding one of the gaps 210 to hang the cable hangers 126 from the solar infrastructure 100. In other embodiments, the cable hangers 126 may be hung from some other part of the solar infrastructure 100, such as directly from the torque tube 108, e.g., by configuring the hooked ends 134 with sufficient size to receive therein the torque tube 108.

Figures 3A, 3B:
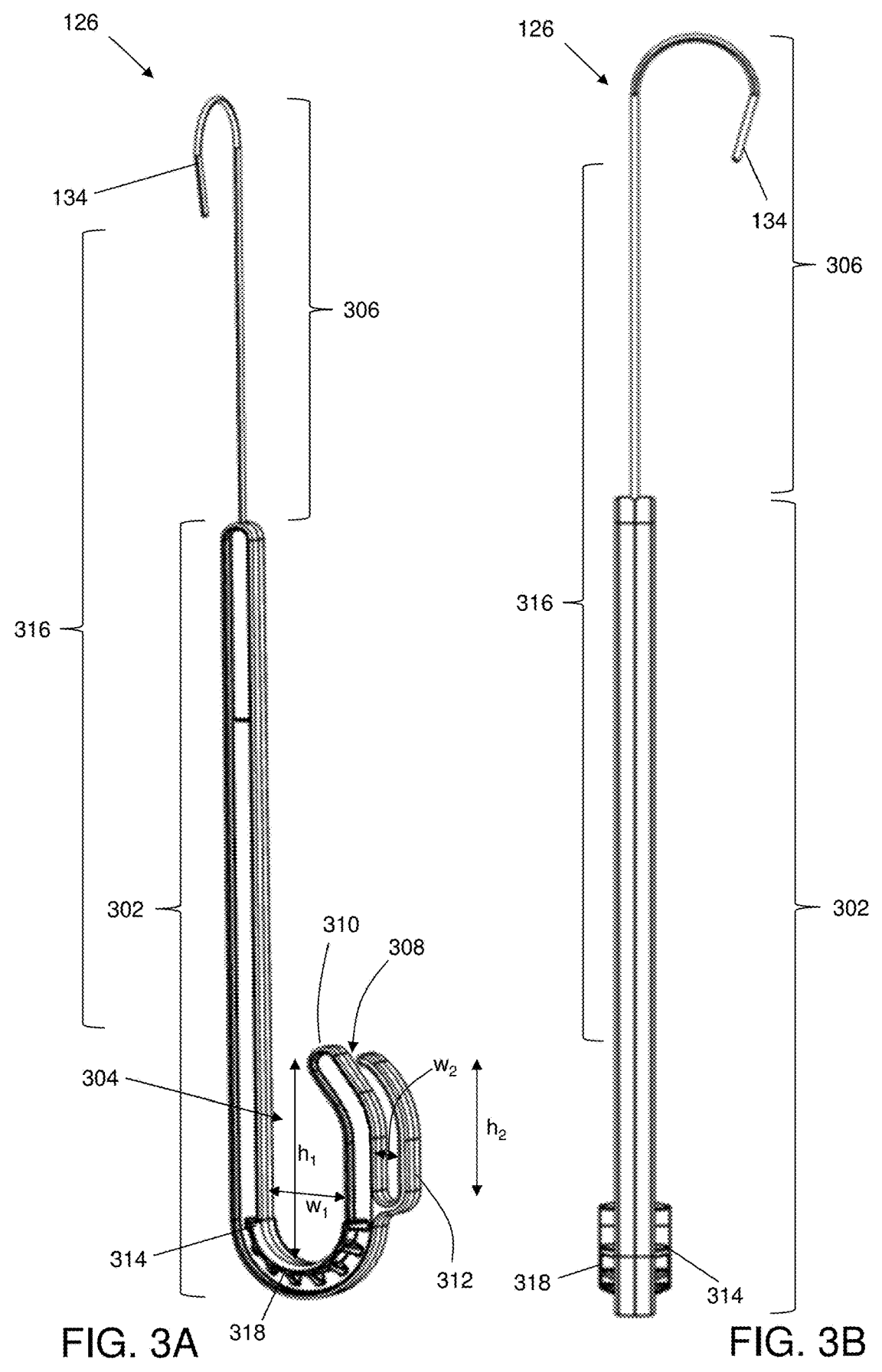
Figures 3C, 3D:
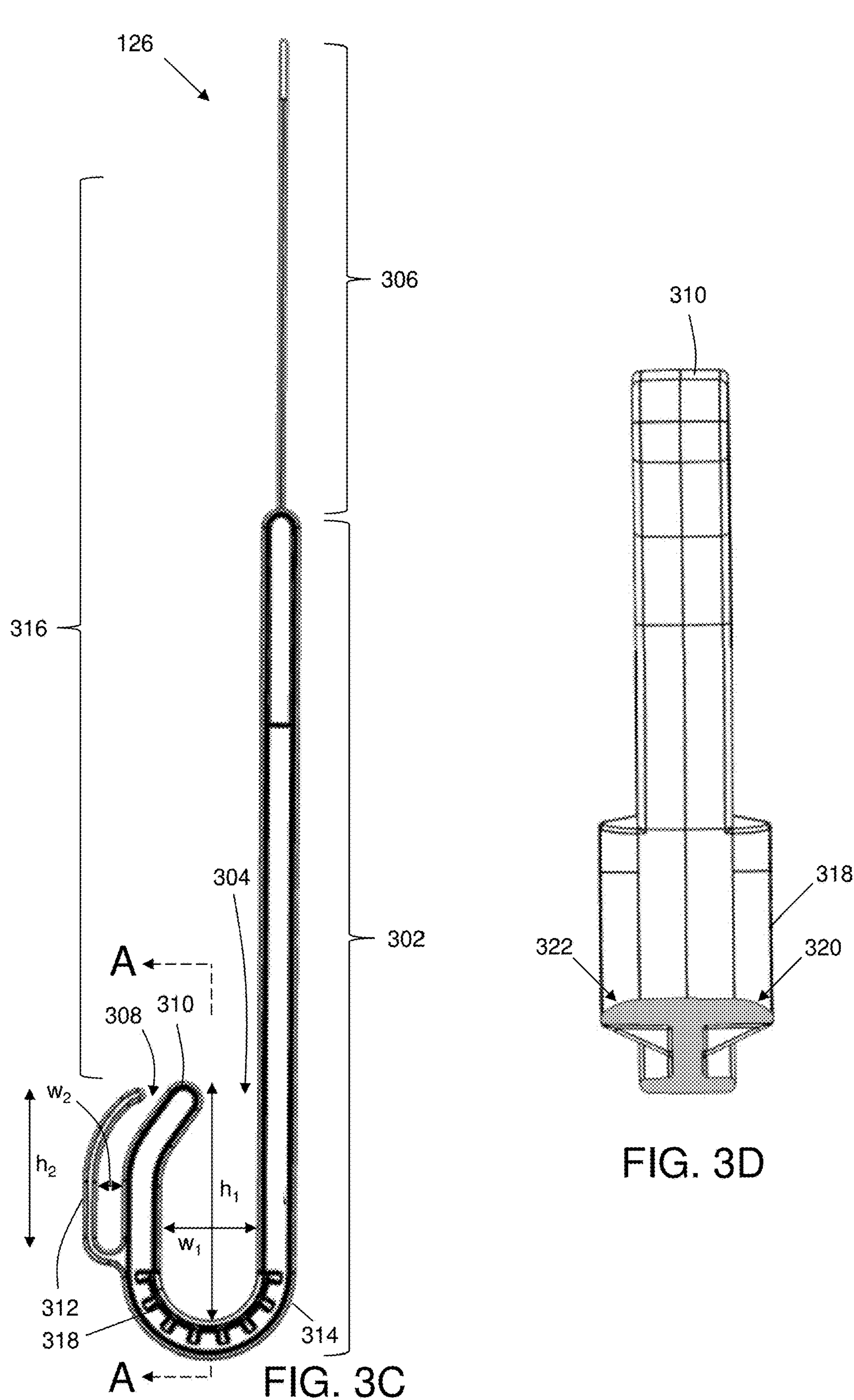

FIGS. 3A-3D illustrate one of the cable hangers 126 of FIG. 1, arranged in accordance with at least one embodiment herein. FIG. 3A is a perspective view, FIG. 3B is a rear view, FIG. 3C is a right-side view, and FIG. 3D is a cross-sectional view along cutting plane A-A in FIG. 3C. As illustrated, the cable hanger 126 includes a body 302 that defines a cable retention channel 304 and an upper portion 306 that extends from the body 302 and is configured to suspend the cable hanger 126 from structure of a tracker array, such as (directly or indirectly) from a torque tube 108. The body 302 may include plastic and/or the upper portion 306 may include metal. In an example, the metal of the upper portion 306 may extend into the body 302 partway or completely along the length of the body 302. Alternatively or additionally, the body 302 and the upper portion 306 may include the same material and/or one or both of the body 302 or the upper portion 306 may include one or more other materials.

In some embodiments, the body 302 defines a second cable retention channel 308 adjacent to the cable retention channel 304. The body 302 includes a channel separator 310 to separate the cable retention channel 304 from the second cable retention channel 308. The cable retention channel 304 may be configured to receive and support therein one or more first cables while the second cable retention channel 308 may be configured to receive and support therein one or more second cables. The cable retention channel 304 has a width $w_1$ and a height $h_1$ while the second cable retention channel 308 has a width $w_2$ and a height $h_2$. In general, the cable retention channel 304 may be larger than the second cable retention channel 308. For example, one or both of the width $w_1$ and the height $h_1$ of the cable retention channel 304 may be respectively greater than the corresponding width $w_2$ and height $h_2$ of the second cable retention channel 308. The cable retention channel 304 may be greater than the second cable retention channel 308 to receive and support larger diameter cables and/or a greater number of cables in the cable retention channel 304 than in the second cable retention channel 308. For example, the cable retention channel 304 may be configured to support one or more relatively larger cables such as trunk or feeder cables while the second cable retention channel 308 may be configured to support one or more relatively smaller cables such communication cables.

As illustrated in, e.g., FIGS. 3A and 3C, an opening width of the cable retention channel 304 may be smaller than the width $w_1$ deeper in the cable retention channel 304. Similarly, an opening width of the second cable retention channel 308 may be smaller than the width $w_2$ deeper in the second cable retention channel 308. In other embodiments, the cable retention channel 304 and/or the second cable retention channel 308 may have a consistent width both at the opening and deeper in the cable retention channel 304 or the second cable retention channel 308.

The body 302 includes a first hook (including the channel separator 310) that defines the cable retention channel 304 and a second hook 312 extending from the first hook that defines the second cable retention channel 308. One or both of the first hook and the second hook 312 may be resiliently deformable. For example, in some embodiments the opening width of the cable retention channel 304 may be smaller than a diameter of the cables (e.g., feeder or trunk cables) configured to be received and support therein. In these and other embodiments, the body 302, including the first hook, may be resiliently deformable so as to flex outward to expand the opening when a corresponding cable is inserted into or removed from the cable retention channel 304 through the opening before returning to or at least towards its unflexed state after the cable clears the opening and is deeper within the cable retention channel 304. Alternatively or additionally, the opening width of the second cable retention channel 308 may be smaller than a diameter of the cables (e.g., communication cables) configured to be received and support therein. In these and other embodiments, the body 302, including the second hook 312 and/or the channel separator 310, may be resiliently deformable so as to flex outward to expand the opening when a corresponding cable is inserted into or removed from the second cable retention channel 308 through the opening before returning to or at least towards its unflexed state after the cable clears the opening and is deeper within the second cable retention channel 308.

As illustrated, the upper portion 306 includes the hooked end 134 which may be configured to hang from structure of a tracker array. For example, as described with respect to FIGS. 1 and 2, the hooked end 134 may be inserted through the gap 210 to hang from the fastener 208 of the clamp 132, may be sufficiently large to hang directly from the torque tube 108, or may be configured to hang from some other structure of the tracker array.

Returning to FIGS. 3A-3D, the cable hanger 126 additionally includes a cable retention end 314, and an elongate portion 316 extending between the hooked end 134 and the cable retention end 314. The hooked end 134 may be included in the upper portion 306, the cable retention end 314 may be included in the body 302, and different portions of the elongate portion 316 may be respectively included in the upper portion 306 or the body 302.

The elongate portion 316 may be sufficiently long to suspend and support one or more cables within the cable retention channel 304 and/or the second cable retention channel 308 a desired distance below a torsion tube or other structure of the tracker array. For example, the elongate portion 316 may be sufficiently long to support one or more cables within the cable retention channel 304 and/or within the second cable retention channel 306 at least 14, 15, 16, or even 17 inches (or other distance) below the torsion tube or other structure. As another example, the length of the elongate portion 316 may be at least 7, 8, 9, 10, 11, or even 11.5 inches (or other length). Alternatively or additionally, the length of the elongate portion 316 may be at least two times, three times, four times, or some other multiple (greater than 1) of a depth of the cable retention channel 304.

In some embodiments, the cable retention end 314 may include a widened support 318 that extends longitudinally along a base of the cable retention channel 304. The widened support 318 may improve/increase support for cables retained therein. The widened support 318 may reduce a likelihood of cables breaking or bending due to being supported at a smaller contact patch. Alternatively or additionally, and as illustrated in FIG. 3D, the widened support 318 may have rounded edges 320, 322 to reduce the likelihood of cables bending or breaking compared to a sharp edge.

Figures 4A, 4B:
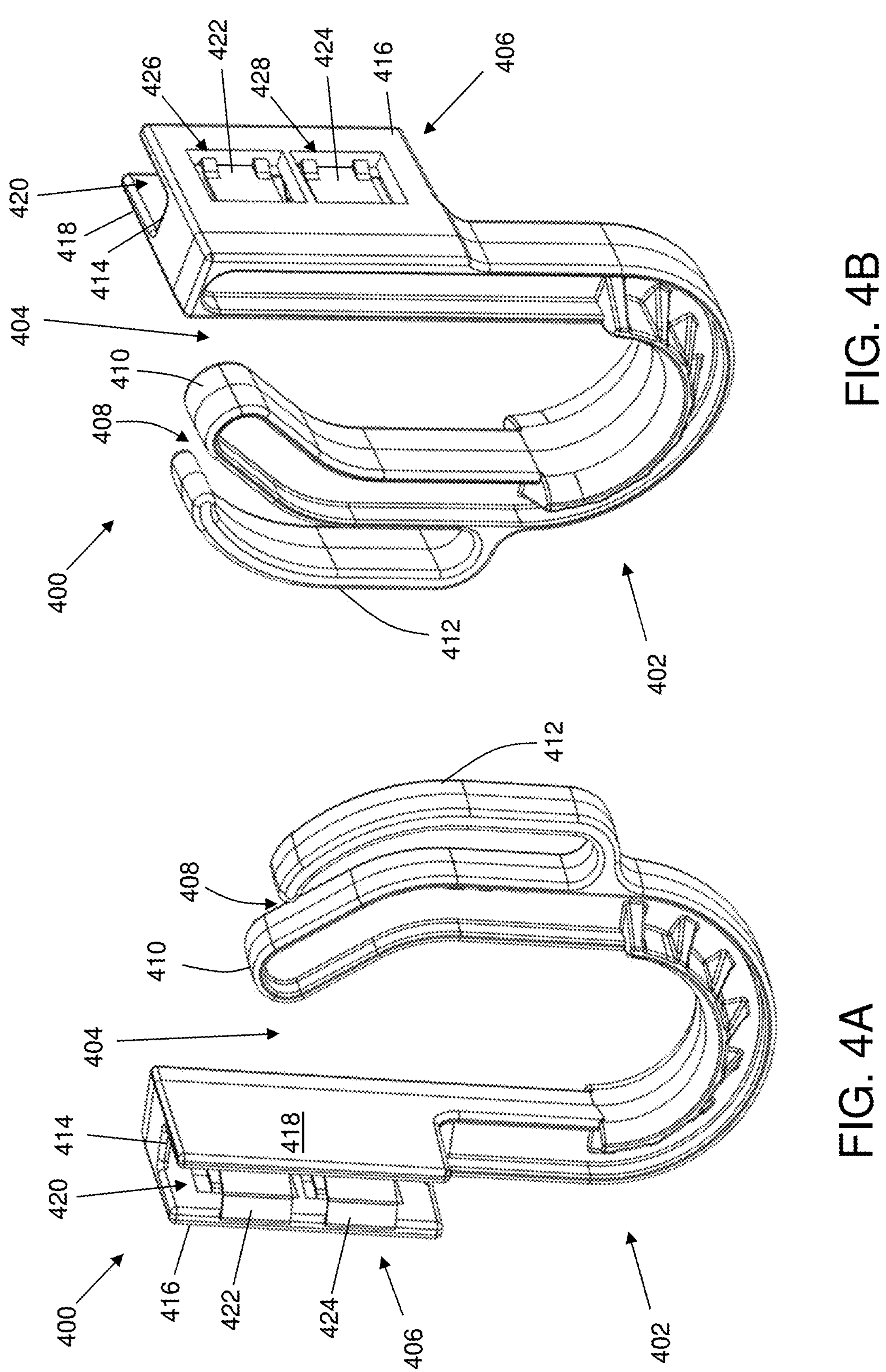
FIGS. 4A-4C illustrate another example cable hanger that may be implemented in the solar infrastructure of FIG. 1.
Figure 4C:
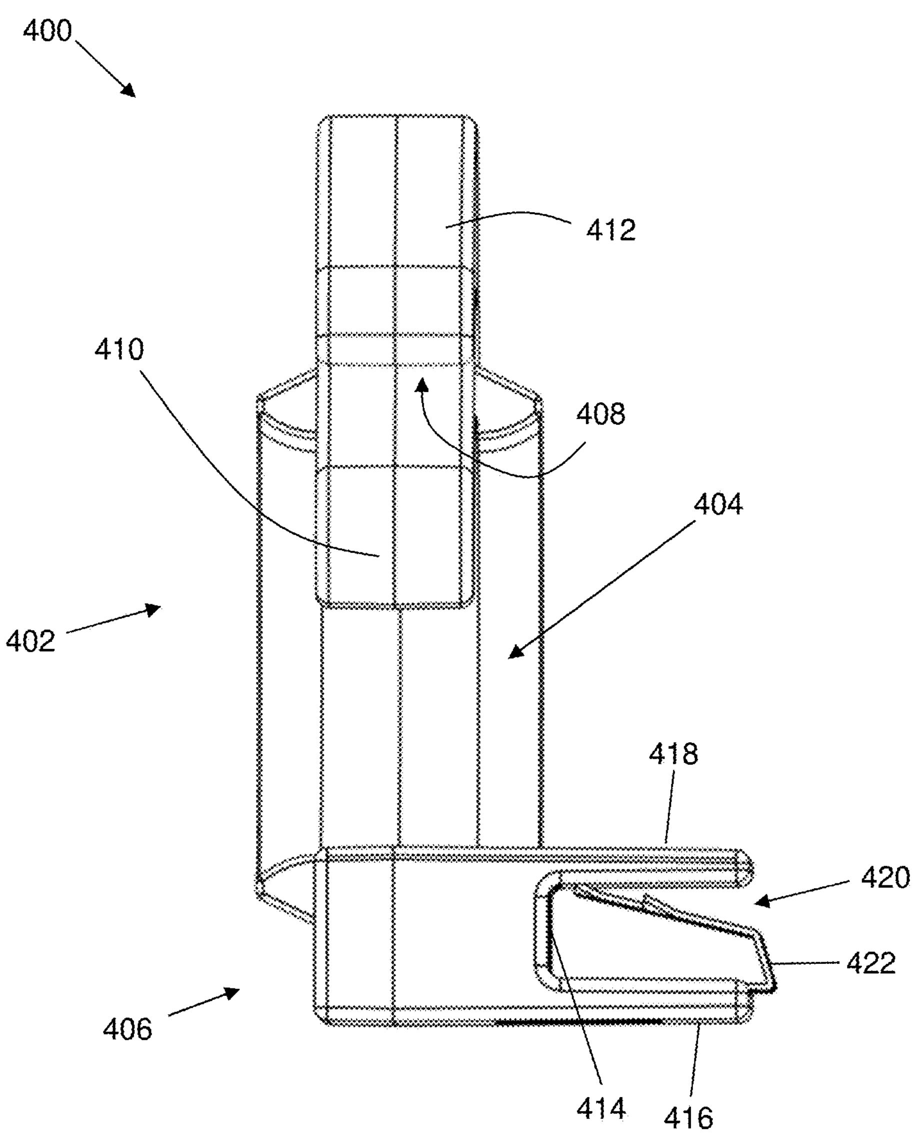

FIGS. 4A-4C illustrate another example cable hanger 400 that may be implemented in the solar infrastructure 100 of FIG. 1, arranged in accordance with at least one embodiment described herein. One or more cable hangers 400 may be implemented in the solar infrastructure 100 or other solar infrastructure to support cables therefrom. The one or more cable hangers 400 may be implemented instead of or in addition to other cable hangers, such as the cable hangers 126 and/or the cable hangers 118 of FIG. 1.

Similar to the cable hangers 126, the cable hanger 400 of FIGS. 4A-4C includes a body 402 that defines a cable retention channel 404 and an upper portion 406 that extends from the body 402 and is configured to suspend the cable hanger 400 from structure of a tracker array or other solar infrastructure, such as from an H-pile or I-pile. As illustrated, the body 402 and the upper portion 406 may be integrally formed and may include plastic and/or other material(s). Alternatively, the body 402 and the upper portion 406 may be formed as discrete components and subsequently coupled, e.g., permanently or temporarily/removably.

The body 402 of the cable hanger 400 may be similar or identical to the cable retention end 314 of the cable hanger 126 of FIGS. 3A-3D. For example, the body 402 as illustrated in FIGS. 4A-4C defines a second cable retention channel 408 adjacent to the cable retention channel 404 and includes a channel separator 410 to separate the cable retention channel 404 from the second cable retention channel 408. The cable retention channel 404 may be configured to receive and support therein one or more first cables while the second cable retention channel 408 may be configured to receive and support therein one or more second cables. In general, the cable retention channel 404 may be larger than the second cable retention channel 408. For example, one or both of the width and the height of the cable retention channel 404 may be respectively greater than the corresponding width and height of the second cable retention channel 408. The cable retention channel 404 may be greater than the second cable retention channel 408 to receive and support larger diameter cables and/or a greater number of cables in the cable retention channel 404 than in the second cable retention channel 408. For example, the cable retention channel 404 may be configured to support one or more relatively larger cables such as trunk or feeder cables while the second cable retention channel 408 may be configured to support one or more relatively smaller cables such communication cables.

The body 402 includes a first hook (including the channel separator 410) that defines the cable retention channel 404 and a second hook 412 extending from the first hook that defines the second cable retention channel 408. One or both of the first hook and the second hook 412 may be resiliently deformable. For example, in some embodiments the opening width of the cable retention channel 404 may be smaller than a diameter of the cables (e.g., feeder or trunk cables) configured to be received and support therein. In these and other embodiments, the body 402, including the first hook, may be resiliently deformable so as to flex outward to expand the opening when a corresponding cable is inserted into or removed from the cable retention channel 404 through the opening before returning to or at least towards its unflexed state after the cable clears the opening and is deeper within the cable retention channel 404. Alternatively or additionally, the opening width of the second cable retention channel 408 may be smaller than a diameter of the cables (e.g., communication cables) configured to be received and support therein. In these and other embodiments, the body 402, including the second hook 412 and/or the channel separator 410, may be resiliently deformable so as to flex outward to expand the opening when a corresponding cable is inserted into or removed from the second cable retention channel 408 through the opening before returning to or at least towards its unflexed state after the cable clears the opening and is deeper within the second cable retention channel 408.

Although not labeled in FIGS. 4A-4C, the body 402 of the cable hanger 400 may include a widened support with rounded edges, similar to the widened support 318 and rounded edges 320, 322 of FIGS. 3A-3D.

In the example of FIGS. 4A-4C, the upper portion 406 of the cable hanger 400 includes a component retention clip having a base wall 414 and two side walls 416, 418 that form a slot 420 therebetween. The cable hanger 400 may be configured to be detachably attached to solar infrastructure by the component retention clip of the upper portion 406 and one or more grip elements 422, 424 disposed in the slot 420. In particular, the component retention clip of the upper portion 406 may be configured to couple to a component or other structure by receiving a planar substrate of the component into the slot 420 and essentially clamping or otherwise releasably coupling to the planar substrate using the grip elements 422, 424. In some embodiments, a planar substrate portion of a mounting bracket, H-pile, I-beam, cross-beam, rail, or other beam may be positioned within the slot 420.

As illustrated, the cable hanger 400 includes the grip elements 422, 424 in the slot 420 of the component retention clip body. Each grip element 422, 424 may be attached to the component retention clip by engaging a corresponding grip receptacle 426, 428 formed in the side wall 416 (or alternatively in the side wall 418).

Figure 5:
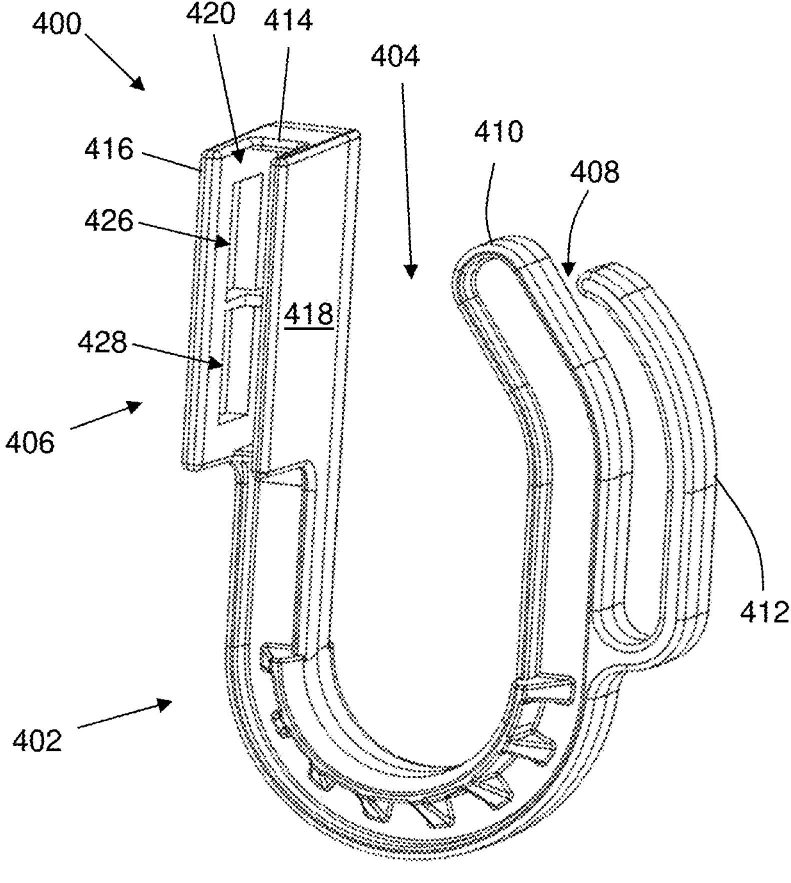
FIG. 5 illustrates the cable hanger of FIG. 4A-4C without any grip elements.
Figure 6A:
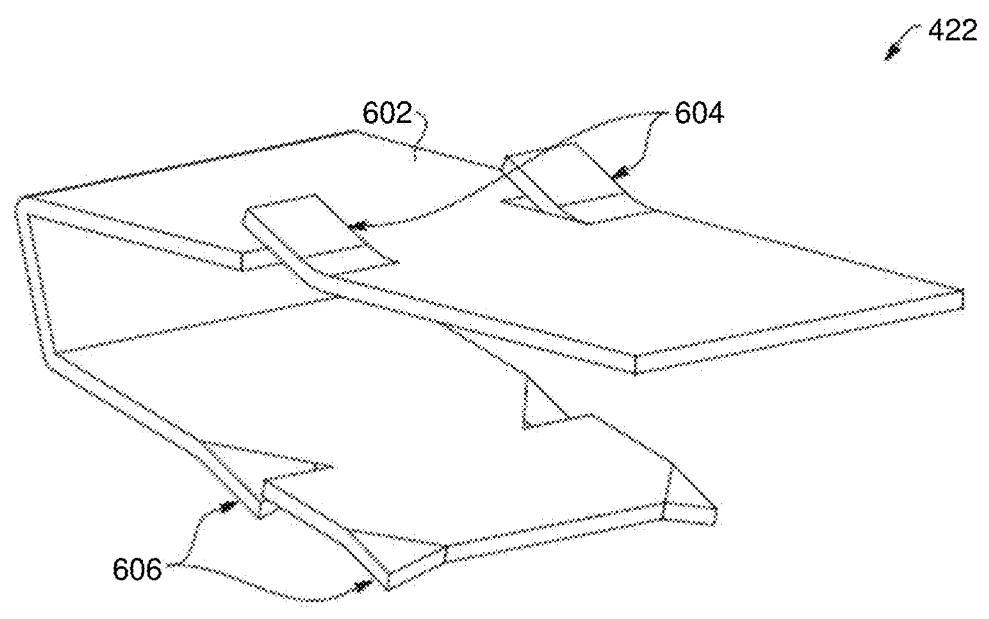
FIGS. 6A-6B illustrate a grip element of FIGS. 4A-4C.
Figure 6B:
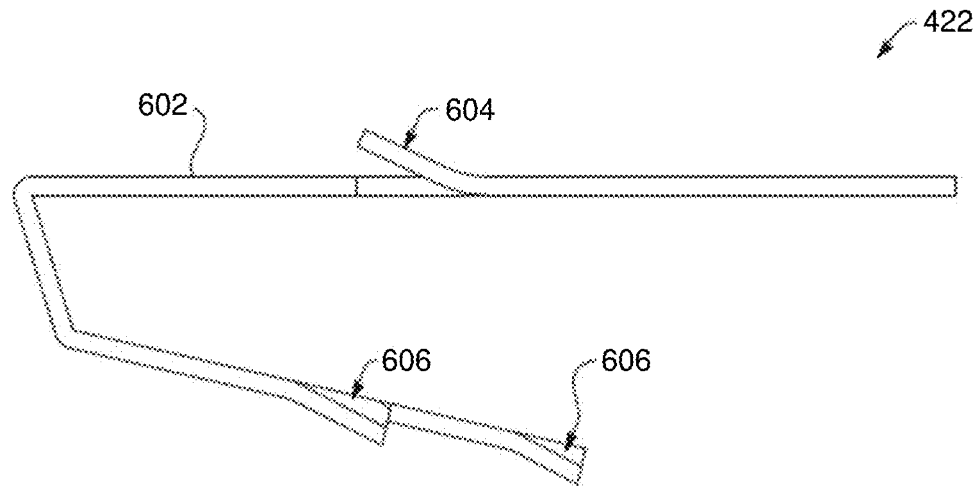

FIG. 5 illustrates the cable hanger 400 of FIGS. 4A-4C without the grip elements 422, 424, arranged in accordance with at least one embodiment described herein. FIGS. 6A-6B illustrate the grip element 422 of FIGS. 4A-4C, arranged in accordance with at least one embodiment described herein. The grip element 424 may be similar or identical to the grip element 422.

Referring to FIGS. 4A-6B, the grip element 422 may include a planar member 602 that slides into the slot 420. The slot 420 may be in communication with, and/or the side wall 416 may include, the grip receptacle 426 (e.g., an aperture, recess, receptacle, or the like), that may receive retention spurs 604 of the grip element 422 to retain the grip element 422 in the slot 420.

The grip element 422 may further include teeth 606. The teeth 606 may be configured to contact and/or engage a planar substrate of a component received in the slot 420 of the component retention clip of the cable hanger 400 when the cable hanger 400 is attached to the planar substrate of the component. The teeth 606 may serve to prevent or at least inhibit the planar substrate from slipping out of the slot 420. The retention spurs 604 may hold the grip element 422 firmly in the component retention clip of the upper portion 406 of the cable hanger 400 by protruding into the grip receptacle 426. The retention spurs 604 may serve to brace the grip element 422 to prevent or at least inhibit the grip element 422 from moving relative to the component retention clip of the upper portion 406 of the cable hanger 400. The two retention spurs 604 protrude into the grip receptacle 426, and thereby have a resistance force against the walls of the grip receptacle 426. The grip element 424 may similarly have retention spurs 604 that protrude into the grip receptacle 428 to retain the grip element 424 within the slot 420.

The retention spurs 604 may be formed in such a way as to allow for removal of the grip element 422 from the component retention clip of the upper portion 406 of the cable hanger 400. For example, the retention spurs 604 and/or the grip element 422 may be formed so as to allow movement of the grip element 422 (or at least a portion of it that includes the retention spurs 604) towards the side wall 418 sufficiently far for the retention spurs 604 to clear walls of the grip receptacle 426 to allow for removal of the grip element 422. In some embodiments, the grip element 422 may be formed in such a way so as to apply force to the base wall 414 and/or the side walls 416, 418 when the cable hanger 400 is not attached to the planar substrate of the component to retain the grip element 422 in place.

In this and other examples (e.g., FIGS. 4A-4C, 9), the grip element 422 (and/or 424) is formed of a material that causes it to resist deformation and return to its original shape after deformation. In some embodiments, the grip element 422 is metal, resilient plastic, elastomer, or other deformable and shape memory material. The grip element 422 may provide increased grip strength to the component retention clip of the cable hanger 400. The grip element 422 may bend as the component retention clip is placed on a planar support structure, such that the grip element 422 is pushed to collapse to resiliently press against the planar support structure. In one example of an orientation, the grip element 422 is mounted to a slot-side surface of the side wall 416, but it could be switched to a slot-side surface of the side wall 418 with appropriate recesses to receive the retention spurs 604. The grip element 422 may exert a force such that the planar support structure is pressed by both the grip element 422 and the slot-side surface of the sidewall 418 (or the slot-side surface of the sidewall 416 when switched). The slot 420 may receive the planar support structure so that the pressing of the grip element 422 provides a grip normal to the plane of the planar support structure. The planar support structure may be pressed into the slot 420 in a direction substantially towards the base wall 414 of the slot 420, preventing the component retention clip of the cable hanger 400 from becoming detached from the support structure (e.g., bracket, H-pile, I-pile, or the like).

Figure 7:
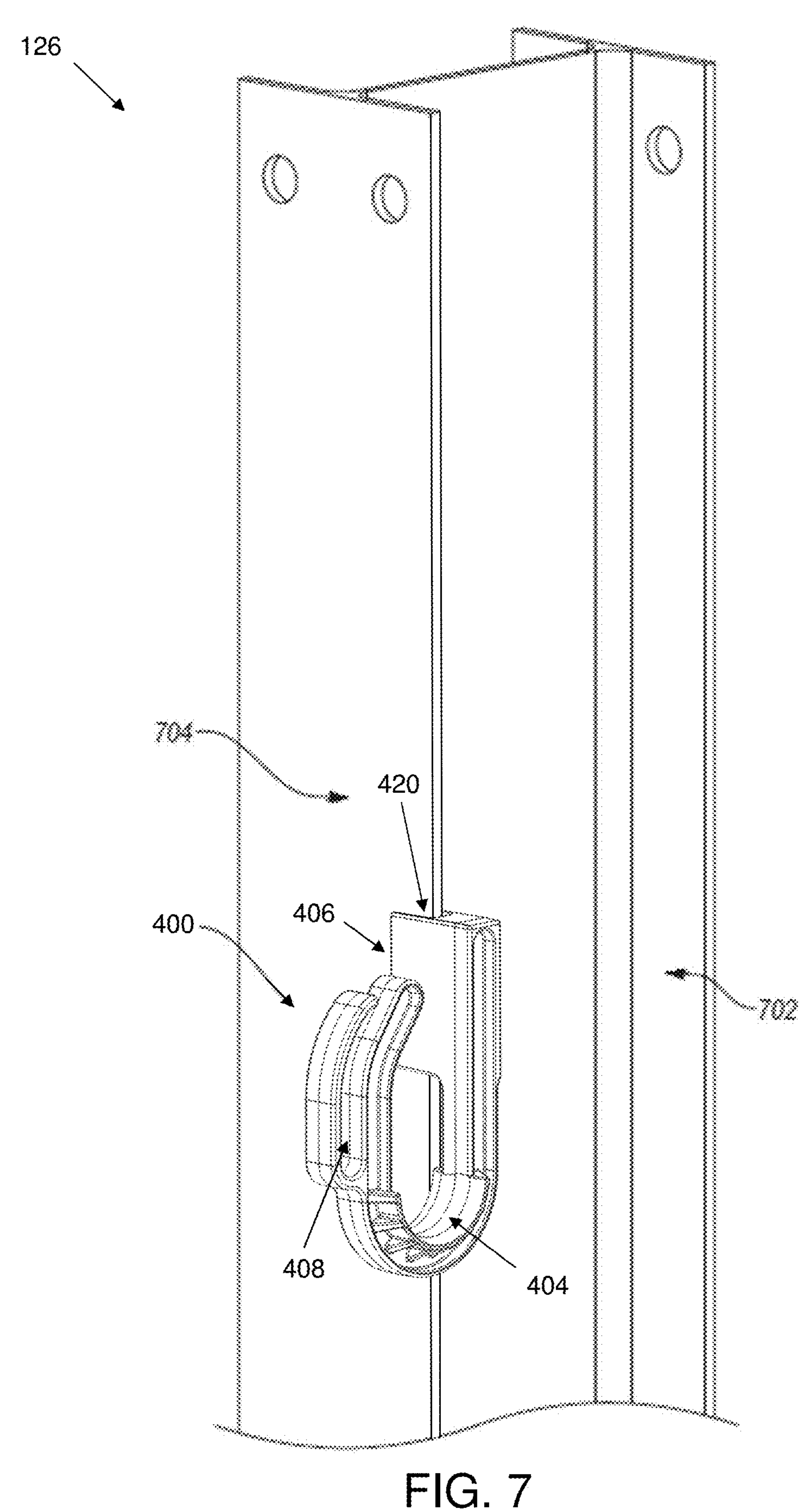
FIG. 7 illustrates example structure of a tracker array or other solar infrastructure to which the cable hanger of FIGS. 4A-4C may be coupled.

FIG. 7 illustrates example structure of a tracker array or other solar infrastructure to which the cable hanger 400 of FIGS. 4A-4C may be coupled, arranged in accordance with at least one embodiment herein. FIG. 7 includes an H-pile 702 with a planar structure or substrate 704, e.g., flange of the H-pile 702. In use, the planar substrate 704 is positioned within the slot 420 so that the grip elements 422, 424 (not visible in FIG. 7) grippingly holds the planar substrate 704 in the component retention clip of the upper portion 406 of the cable hanger 400. When attached, the grip elements 422, 424 may provide sufficient coupling so that the cable hanger 400 stays in place on the component planar substrate 704 when holding one or more cables in the cable retention channel 404 and/or the second cable retention channel 408. In another example, the cable hanger 400 may be mounted to a bracket that may be affixed to any appropriate mounting structure, such as a tracker array torsion beam, H-pile, I-pile, or any other suitable support structure having a planar substrate to position within the slot 420 of the cable hanger 400.

Figure 8:
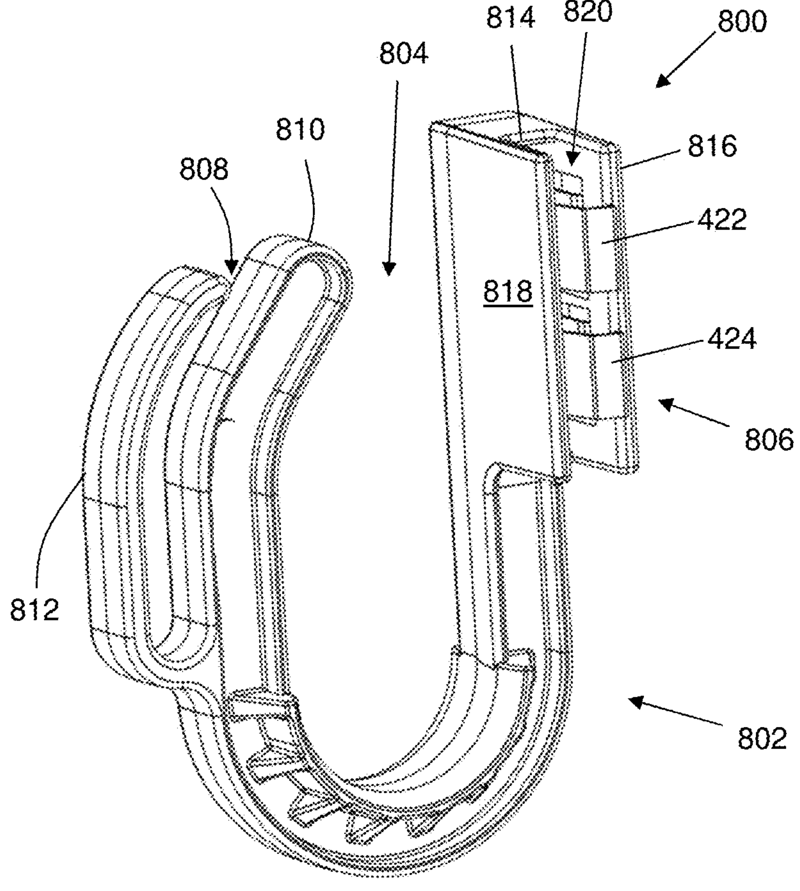
FIG. 8 illustrates another example cable hanger 800 that is similar to the cable hanger 400 of FIGS. 4A-4C.

FIG. 8 illustrates another example cable hanger 800 that is similar to the cable hanger 400 of FIGS. 4A-4C, arranged in accordance with at least one embodiment herein. In particular, the cable hanger 800 includes a body 802 that defines a cable retention channel 804 and an upper portion 806 that extends from the body 802 and is configured to suspend the cable hanger 800 from structure of a tracker array or other solar infrastructure, such as from an H-pile or I-pile. The body 802 further defines a second cable retention channel 808 and includes a channel separator 810 to separate the cable retention channel 804 from the second cable retention channel 808. The body 802 includes a first hook (including the channel separator 810) that defines the cable retention channel 804 and a second hook 812 extending from the first hook that defines the second cable retention channel 808. One or both of the first hook and the second hook 812 may be resiliently deformable.

As further illustrated in FIG. 8, the upper portion 806 of the cable hanger 800 includes a component retention clip having a base wall 814 and two side walls 816, 818 that form a slot 820 therebetween. The cable hanger 800 may be configured to be detachably attached to solar infrastructure by the component retention clip of the upper portion 806 and the one or more grip elements 422, 424 disposed in the slot 820. In particular, the component retention clip of the upper portion 806 may be configured to couple to a component or other structure by receiving a planar substrate of the component into the slot 820 and essentially clamping or otherwise releasably coupling to the planar substrate using the grip elements 422, 424.

The cable hanger 800 works in the same or similar manner as the cable hanger 400 of FIGS. 4A-4C. The only difference between the cable hanger 800 and the cable hanger 400 is that the component retention clip in the upper portion 806 of the cable hanger 800 faces an opposite direction rom the component retention clip in the upper portion 406 of the cable hanger 400.

Figure 9:
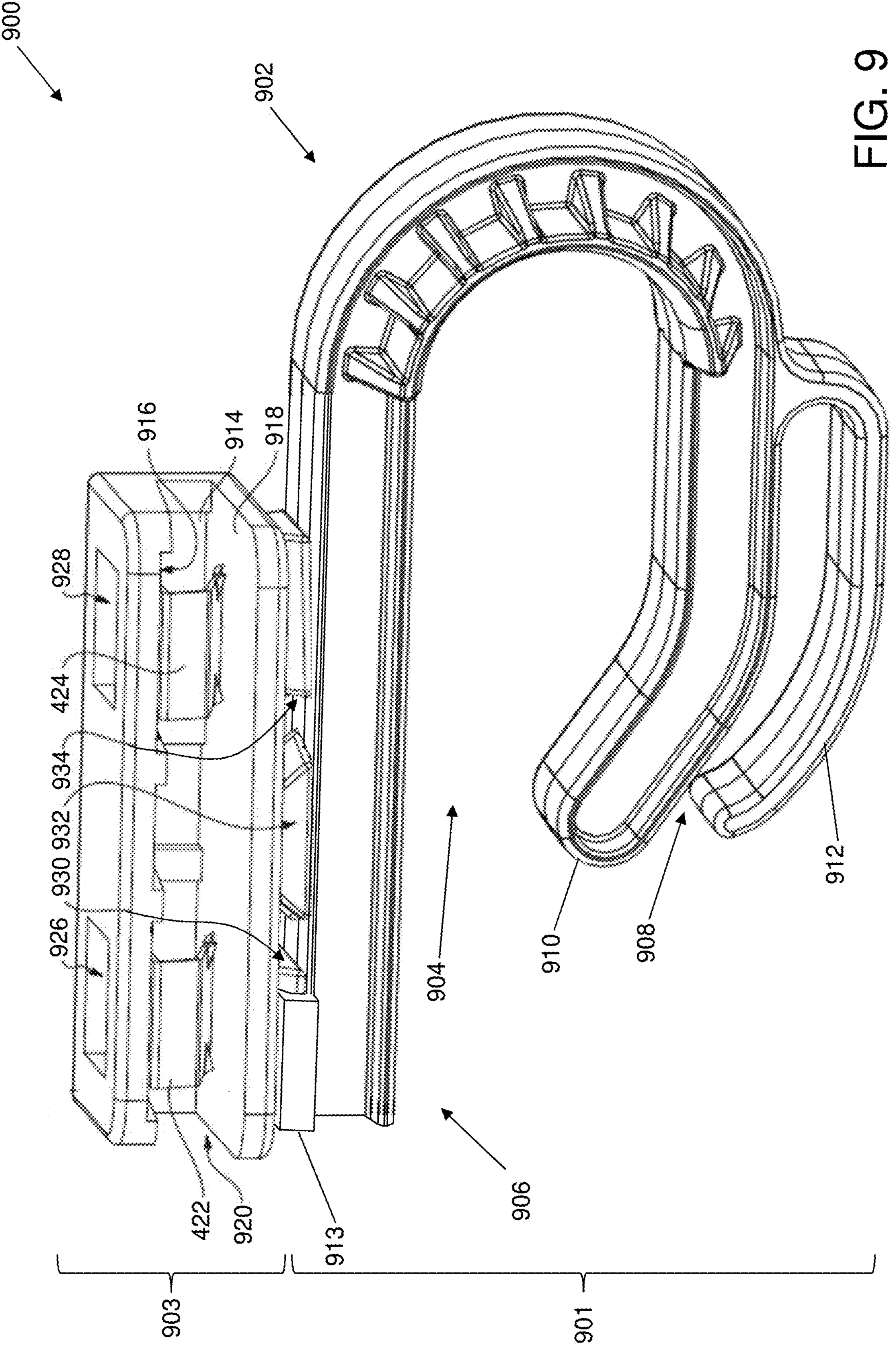
FIG. 9 illustrates an example cable hanger system that includes a cable hanger and a component retention clip.

FIG. 9 illustrates an example cable hanger system 900 that includes a cable hanger 901 and a component retention clip 903, arranged in accordance with at least one embodiment described herein. One or more cable hanger systems 900 may be implemented in the solar infrastructure 100 or other solar infrastructure to support cables therefrom. The one or more cable hanger systems 900 may be implemented instead of or in addition to other cable hangers, such as the cable hangers 126 and/or the cable hangers 118 of FIG. 1 and/or the cable hanger 400 of FIGS. 4A-4C.

Similar to the cable hangers 126, the cable hanger 901 of FIG. 9 includes a body 902 that defines a cable retention channel 904 and an upper portion 906 that extends from the body 902 and is configured to suspend the cable hanger 901 from structure of a tracker array or other solar infrastructure, such as from an H-pile or I-pile. In this example, the cable hanger 901 is configured to indirectly suspend one or more cables from a tracker array or other solar infrastructure by coupling indirectly to the tracker array or other solar infrastructure through the component retention clip 903. As illustrated, the body 902 and the upper portion 906 may be integrally formed and may include plastic and/or other material(s). Alternatively, the body 902 and the upper portion 906 may be formed as discrete components and subsequently coupled, e.g., permanently or temporarily/removably.

The body 902 of the cable hanger 901 may be similar or identical to the cable retention end 314 of the cable hanger 126 of FIGS. 3A-3D. For example, the body 902 as illustrated in FIG. 9 defines a second cable retention channel 908 adjacent to the cable retention channel 904 and includes a channel separator 910 to separate the cable retention channel 904 from the second cable retention channel 908. The cable retention channel 904 may be configured to receive and support therein one or more first cables while the second cable retention channel 908 may be configured to receive and support therein one or more second cables. In general, the cable retention channel 904 may be larger than the second cable retention channel 908. For example, one or both of the width and the height of the cable retention channel 904 may be respectively greater than the corresponding width and height of the second cable retention channel 908. The cable retention channel 904 may be greater than the second cable retention channel 908 to receive and support larger diameter cables and/or a greater number of cables in the cable retention channel 904 than in the second cable retention channel 908. For example, the cable retention channel 904 may be configured to support one or more relatively larger cables such as trunk or feeder cables while the second cable retention channel 908 may be configured to support one or more relatively smaller cables such communication cables.

Although not labeled in FIG. 9, the body 902 of the cable hanger 901 may include a widened support with rounded edges, similar to the widened support 318 and rounded edges 320, 322 of FIGS. 3A-3D.

The body 902 includes a first hook (including the channel separator 910) that defines the cable retention channel 904 and a second hook 912 extending from the first hook that defines the second cable retention channel 908. One or both of the first hook and the second hook 912 may be resiliently deformable. For example, in some embodiments the opening width of the cable retention channel 904 may be smaller than a diameter of the cables (e.g., feeder or trunk cables) configured to be received and support therein. In these and other embodiments, the body 902, including the first hook, may be resiliently deformable so as to flex outward to expand the opening when a corresponding cable is inserted into or removed from the cable retention channel 904 through the opening before returning to or at least towards its unflexed state after the cable clears the opening and is deeper within the cable retention channel 904. Alternatively or additionally, the opening width of the second cable retention channel 908 may be smaller than a diameter of the cables (e.g., communication cables) configured to be received and support therein. In these and other embodiments, the body 902, including the second hook 912 and/or the channel separator 910, may be resiliently deformable so as to flex outward to expand the opening when a corresponding cable is inserted into or removed from the second cable retention channel 908 through the opening before returning to or at least towards its unflexed state after the cable clears the opening and is deeper within the second cable retention channel 908.

In the example of FIG. 9, the upper portion 906 of the cable hanger 901 includes a cable hanger slide-coupling element 913 removably coupled with the component retention clip 903 that is couplable to structure of a tracker array or other solar infrastructure.

The component retention clip 903 has a base wall 914 and two side walls 916, 918 that form a slot 920 therebetween. The cable hanger 900 may be configured to be detachably attached to solar infrastructure by the component retention clip 903 and the one or more grip elements 422, 424 disposed in the slot 920. In particular, the component retention clip 903 may be configured to couple to a component or other structure by receiving a planar substrate of the component into the slot 920 and essentially clamping or otherwise releasably coupling to the planar substrate using the grip elements 422, 424. In some embodiments, a planar substrate portion of a mounting bracket, H-pile, I-beam, cross-beam, rail, or other beam may be positioned within the slot 920.

As illustrated, the component retention clip 903 includes the grip elements 422, 424 in the slot 920 of the component retention clip 903. Each grip element 422, 424 may be attached to the component retention clip 903 by engaging a corresponding grip receptacle 926, 928 formed in the side wall 916 (or alternatively in the side wall 918) in a similar manner to how the grip elements 422, 424 attach to the component retention clip of the upper portion 406 of the cable hanger 400 of FIGS. 4A-4C.

The cable hanger 901 may be removably coupled with the component retention clip 903 by matable and/or complementary coupling elements. In the illustrated embodiment, for instance, the component retention clip 903 includes one or more clip slide-coupling elements 930, 932, 934 each of which is individually matable with and complementary to the cable hanger slide-coupling element 913 of the cable hanger 901. In the illustrated embodiment, the clip slide-coupling elements 930, 932, 934 are coupled to and/or protrude from the side wall 918 of the component retention clip 903. The cable hanger slide-coupling element 913 is coupled to and/or protrudes from the upper portion 906 of the cable hanger 901. The clip slide-coupling elements 930, 932, 934 may be configured to be received in a complementary slide-coupling element. Any slide-coupling element configured to be received in a complementary slide-coupling element may be referred to as a protruding slide-coupling element. The cable hanger slide-coupling element 913 may define a slot configured to receive a complementary protruding slide-coupling element, such as any of the clip slide-coupling elements 930, 932, 934. Any slide-coupling element that defines a slot to receive a complementary protruding slide-coupling element may be referred to as a slot slide-coupling element. The cable hanger slide-coupling element 913 is depicted as a slot slide-coupling element and the clip slide-coupling elements 930, 932, 934 are depicted as protruding slide coupling elements. In other embodiments, they may be reversed. In particular, the cable hanger slide-coupling element may instead be implemented as a protruding slide-coupling element and the clip slide-coupling elements 930, 932, 934 may instead be implemented as slot slide-coupling elements.

In operation, a given protruding slide-coupling elements (such as any of the clip slide-coupling elements 930, 932, 934 in this example) may be slidingly received into a slot slide-coupling element (such as the cable hanger slide-coupling element 913 in this example), such as by aligning and then sliding so that the protrusion is received into the slot. As such, the cable hanger 901 may be slid onto the component retention clip 903. The protrusions and slots may be tapered (e.g., trapezoidal longitudinal plane) so that there is friction tightening during the slide coupling to fix the bodies together. However, human pulling may be used to slide the cable hanger 901 off of the component retention clip 903. In some aspects, a cross-sectional shape of each protruding slide-coupling element 930, 932, 934 in a plane perpendicular to the sliding direction may be complementary to a cross-sectional shape of each slot slide-coupling element 913 in a plane perpendicular to the sliding direction.

One or more cables may be held in place with respect to a planar support structure (e.g., of a tracker array or other solar infrastructure) by way of the cable hanger system 900 via the cable hanger 901. As shown, the cable hanger 901 includes one or more cable retention channels, specifically the cable retention channel 904 and the second cable retention channel 908 in this example. In this way, the cables may be detachably secured with respect to a support structure (e.g., a bracket, H-pile, I-pile, or the like), thereby allowing for easy installation, removal, and repair. Moreover, securing the cables in this manner may ensure orderly cable management, thereby avoiding damage and entanglement-particularly in the case where the panels/bracket are moveable, such as in a solar tracker application.

Figures 10A, 10B:
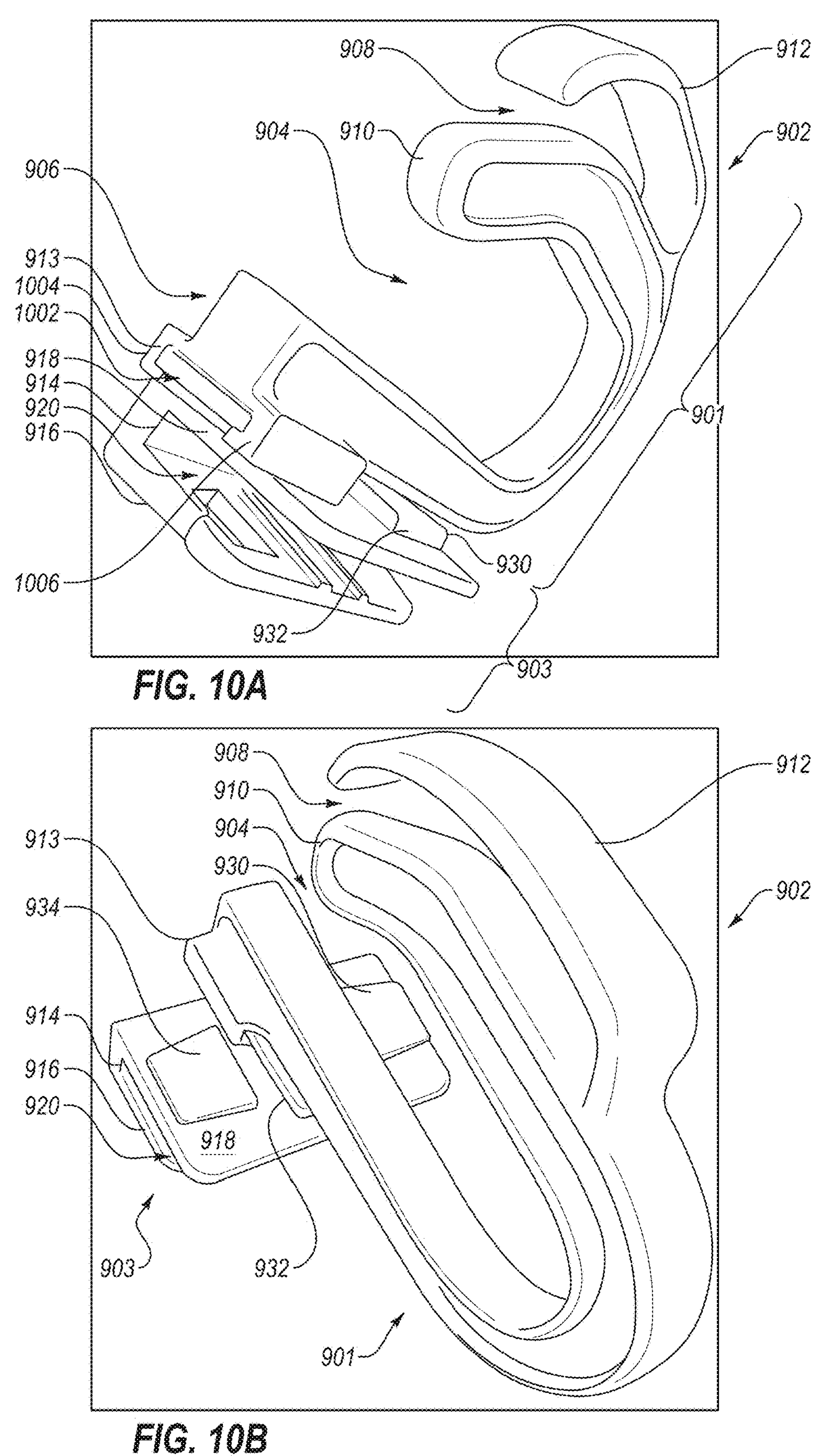
FIGS. 10A-10B illustrate the cable hanger system of FIG. 9 without any grip elements.

FIGS. 10A-10B illustrate the cable hanger system 900 of FIG. 9 without the grip elements 422, 424, arranged in accordance with at least one embodiment described herein. FIG. 10A further depicts a slot 1002 defined in the cable hanger slide-coupling element 913 to receive any of the clip slide-coupling elements 930, 932, 934. As illustrated, the cable hanger slide-coupling element 913 includes two protrusions 1004, 1006 that may define the slot 1002. The slot 1002 may have a trapezoidal shape, e.g., a trapezoidal cross-section in a plane perpendicular to the sliding direction.

FIG. 9 depicts the cable hanger 903 coupled to the component retention clip 903 via (the cable hanger slide coupling element 913 and) the clip slide coupling element 930. FIG. 10A depicts the cable hanger 903 coupled to the component retention clip 903 via (the cable hanger slide coupling element 913 and) the clip slide coupling element 934. FIG. 10B depicts the cable hanger 903 coupled to the component retention clip 903 via (the cable hanger slide coupling element 913 and) the clip slide coupling element 932. Thus, FIGS. 9-10B depict how the cable hanger 901 may be coupled to the component retention clip 903 via (the cable hanger slide-coupling element 913 and) any one of the clip slide-coupling elements 930, 932, 934.

Figure 11:
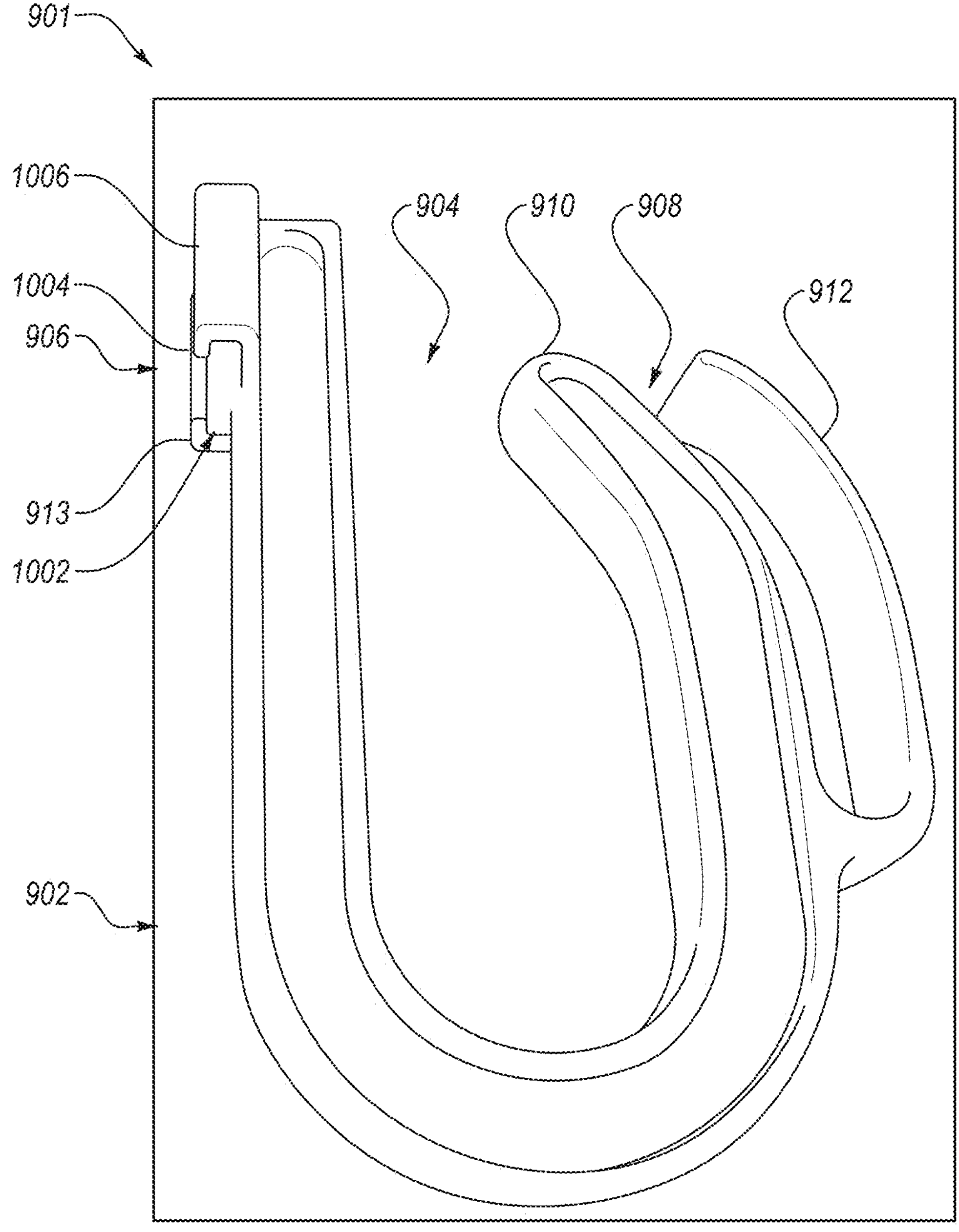
FIG. 11 illustrates a cable hanger of FIGS. 9-10B.

FIG. 11 illustrates the cable hanger 901 of FIGS. 9-10B, arranged in accordance with at least one embodiment herein. FIGS. 12A-12E illustrate the component retention clip 903 of FIG. 9, arranged in accordance with at least one embodiment herein.

The interior shape and dimensions of the slot 920 (and/or the slot 420 of FIGS. 4A-4C) substantially correspond to that of a corresponding outer surface of a support structure to which the cable hanger system 900 (or the cable hanger 400) is coupled. In an embodiment, the slot 920 tapers towards the base wall 914 from its opening (see, e.g., FIGS. 10A, 12D), so as to provide a "clamp" function to enhance the gripping force on the opposing surfaces of the planar support structure; however, the slot 920 may in other embodiments have parallel walls. The material used for the component retention clip 903, such as a ceramic, composite, metal or plastic material, may provide additional resiliency so as to enhance the clamping force applied by the component retention clip 903, thereby securely retaining the cable hanger system 900 with respect to the support structure.

Figure 12A:
FIGS. 12A-12F illustrate a component retention clip of FIG. 9.
Figure 12A:
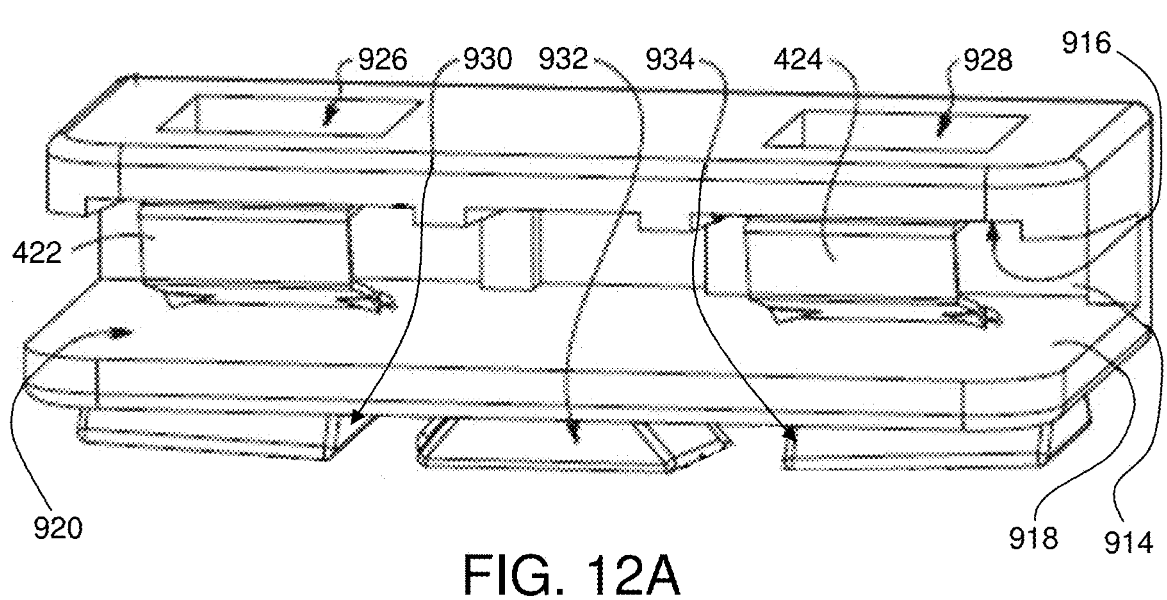
Figure 12B:
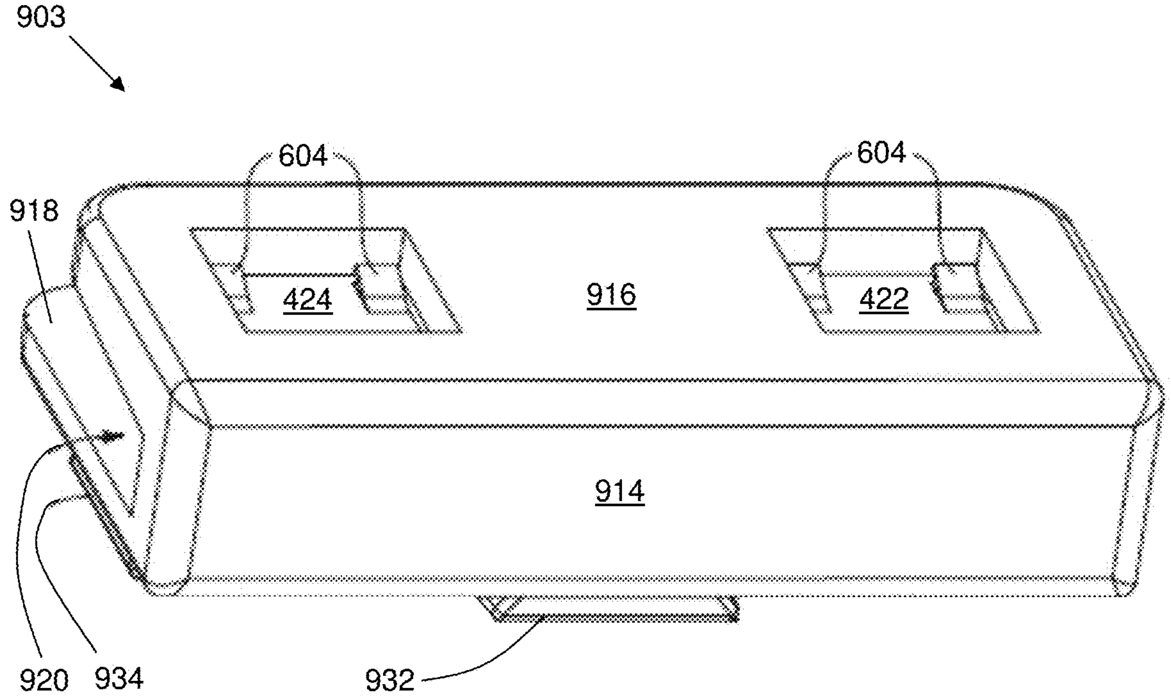
Figure 12C:
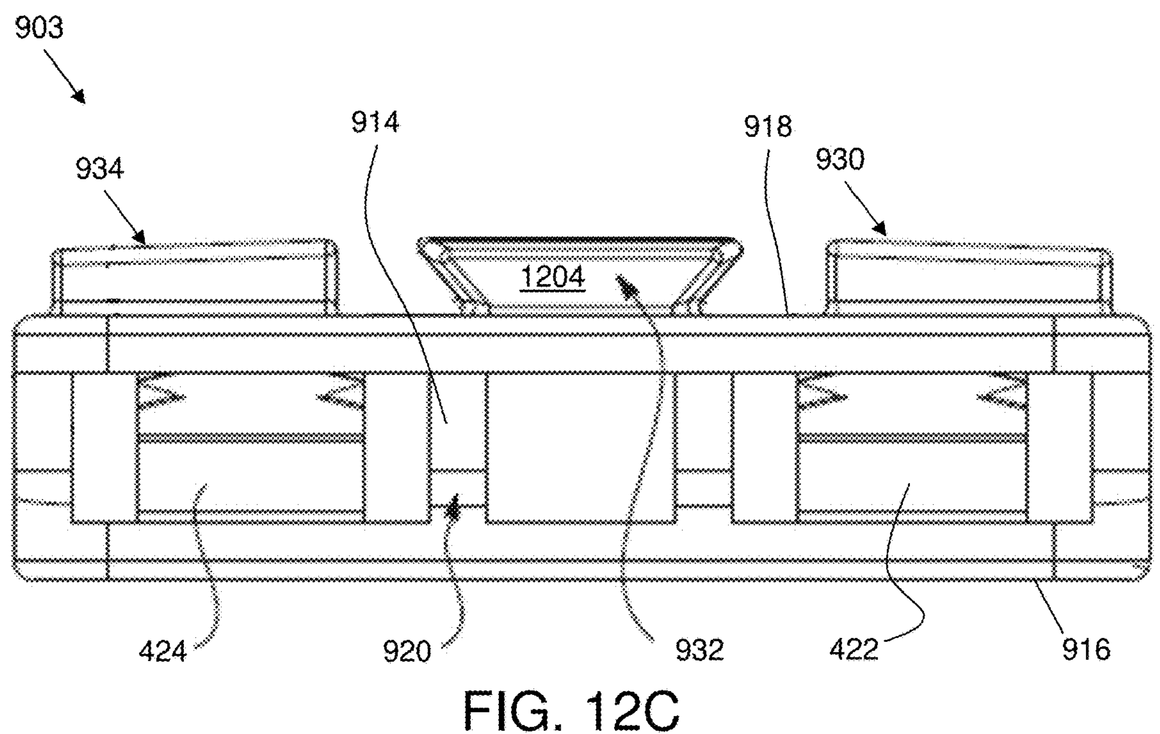
Figure 12D:
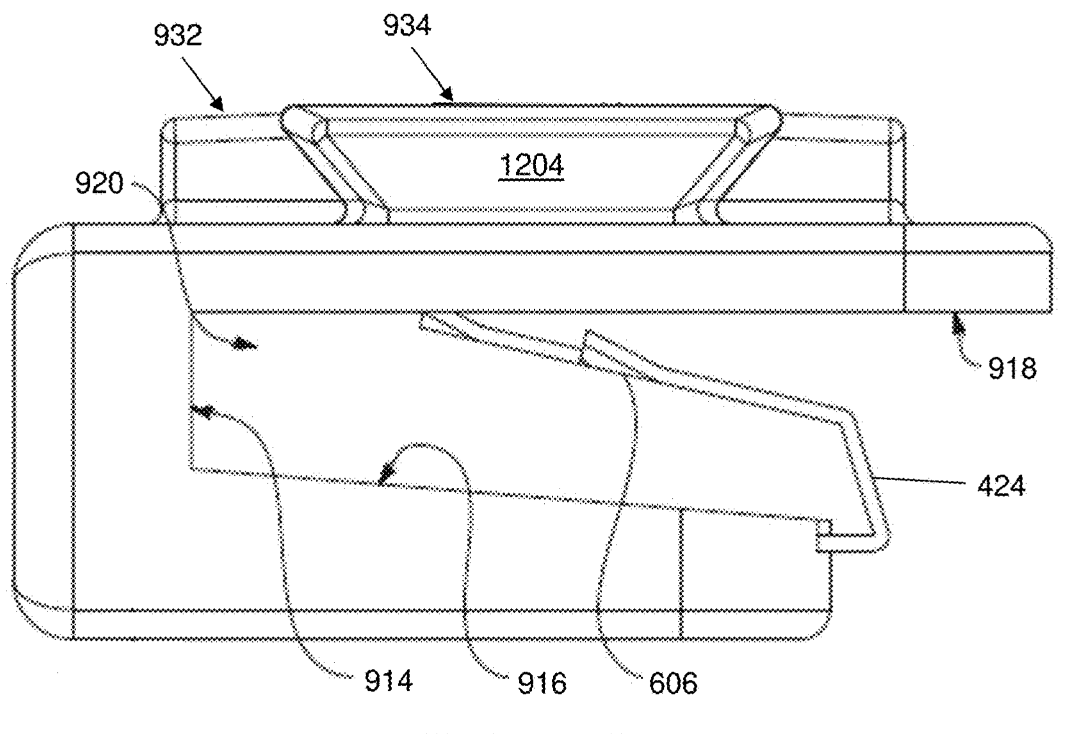
Figure 12E:
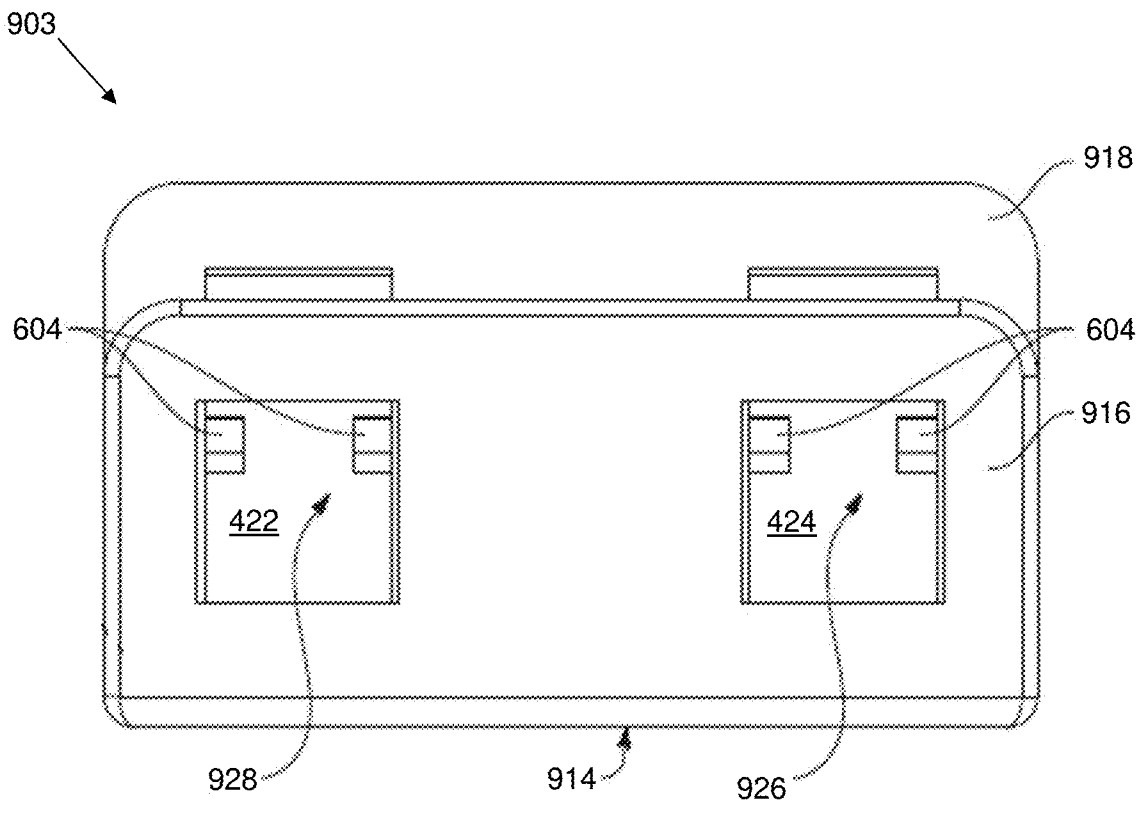
Figure 12F:
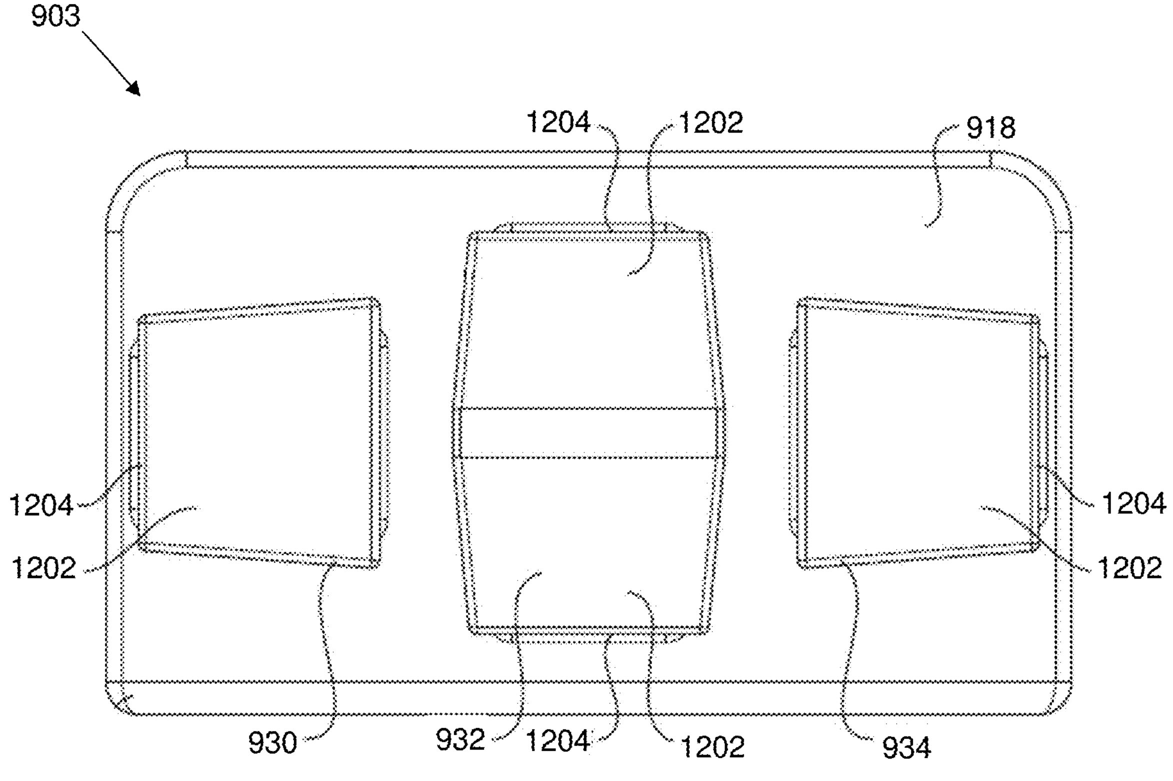

Referring primarily to FIGS. 12C, 12D, and 12F, the clip slide-coupling elements 930, 932, 934 of the component retention clip 903 include a center bi-directional clip slide-coupling element 932, and two side single-direction clip slide-coupling elements 930, 934. The center bi-directional clip slide-coupling element 932 is shown to have two sides that are each a trapezoidal shape that provides a direction of slidability to be received in a corresponding slot slide-coupling element (e.g., the cable hanger slide coupling element 913). As such, the center bi-directional clip slide-coupling element 932 may include two oppositely directed trapezoidal shapes for the slide-coupling function. Accordingly, the center bi-directional clip slide-coupling element 932 may be or include two trapezoidal members that are integrated or separate. The trapezoidal members may be trapezoid in one or more planes, such as a bottom surface 1202 that forms a plane and a side surface 1204, which is also a cross-section that is orthogonal to the bottom surface 1202. Accordingly, the side surface 1204 provides the cross-sectional trapezoidal shape that forms the protruding slide-coupling element shape that interlocks with the corresponding trapezoidal slot (e.g., 1002 in FIGS. 10A-11) in the slot slide-coupling element (e.g., the cable hanger slide-coupling element 913). The bottom surface 1202 that has the trapezoidal shape may provide for the friction fit coupling with the slot slide-coupling element that also has a corresponding trapezoid in the slot shape. Therefore, the slot includes the same corresponding trapezoidal bottom surface and side surface profiles to form a tongue-in-groove slide coupling.

The cable hanger system 900 described with respect to FIGS. 9-12F may be used in the same or similar manner as the cable hangers 400, 800 described with respect to FIGS. 4A-8. The cable hanger system 900 may be more versatile than either of the cable hangers 400, 800 in that the cable hanger 901 may be attached to the component retention clip 903 in any one of four different relative orientations depending on which of the clip slide-coupling elements 930, 932, 934 and/or which side of the center clip slide-coupling element 932 the cable hanger slide coupling element 913 is coupled to. In contrast, the cable hangers 400, 800 each incorporate a component retention clip in their respective upper portion 406, 806 which has a fixed orientation relative to the respective body 402, 802 which may limit the orientations of the cable hangers 400, 800 relative to structure to which the cable hangers 400, 800 may be attached.

Unless specific arrangements described herein are mutually exclusive with one another, the various implementations described herein can be combined to enhance system functionality or to produce complementary functions. Likewise, aspects of the implementations may be implemented in standalone arrangements. Thus, the above description has been given by way of example only and modification in detail may be made within the scope of the present invention.

With respect to the use of substantially any plural or singular terms herein, those having skill in the art can translate from the plural to the singular or from the singular to the plural as is appropriate to the context or application. The various singular/plural permutations may be expressly set forth herein for sake of clarity. A reference to an element in the singular is not intended to mean "one and only one" unless specifically stated, but rather "one or more." Moreover, nothing disclosed herein is intended to be dedicated to the public regardless of whether such disclosure is explicitly recited in the above description.

In general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). Furthermore, in those instances where a convention analogous to "at least one of A, B, and C, etc." is used, in general, such a construction is intended in the sense one having skill in the art would understand the convention (e.g., "a system having at least one of A, B, and C" would include but not be limited to systems that include A alone, B alone, C alone, A and B together, A and C together, B and C together, or A, B, and C together, etc.). Also, a phrase presenting two or more alternative terms, whether in the description, claims, or drawings, should be understood to include one of the terms, either of the terms, or both terms. For example, the phrase "A or B" will be understood to include the possibilities of "A" or "B" or "A and B."

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A cable hanger comprising:

a body that defines a cable retention channel;

an upper portion that extends from the body, the upper portion comprising a component retention clip having a base wall and two side walls that form a slot therebetween; and a grip element disposed in the slot and coupled with at least one of the two side walls, wherein:

the component retention clip forms an aperture;

the grip element includes a retention spur that protrudes into the aperture formed in the component retention clip to hold the grip element in the slot;

the grip element includes one or more teeth to engage a planar substrate of a component when the planar substrate is slidably received in the slot to couple the cable hanger to the component.

2. The cable hanger of claim 1, wherein:

the body further defines a second cable retention channel adjacent and parallel to the cable retention channel;

the second cable retention channel is smaller than the cable retention channel;

the second cable retention channel is both shorter and narrower than the cable retention channel;

the second cable retention channel is configured to receive and support one or more communication cables;

the cable retention channel is configured to receive and support one or more feeder cables that are electrically coupled to one or more solar panels supported by a solar array to which the cable hanger system is coupled;

a first distance across an opening of the cable retention channel is less than a first diameter of each of the one or more feeder cables;

a second distance across an opening of the second cable retention channel is less than a second diameter of each of the one or more communication cables;

the body includes a first hook that defines the cable retention channel and a second hook that defines the second cable retention channel;

the second hook extends from the first hook;

at least one of the first hook or the second hook is resiliently deformable;

the cable retention channel is wider deeper in the cable retention channel than at an opening of the cable retention channel.

3. A cable hanger system comprising:

a cable hanger comprising:

a body that defines a cable retention channel; and an upper portion that extends from the body, the upper portion comprising a cable hanger slide-coupling element configured to couple with a component retention clip that is couplable to structure of a solar array; and the component retention clip, comprising:

a body having a base wall and two side walls forming a slot therebetween;

a grip element in the slot and coupled with at least one of the two side walls; and at least two clip slide-coupling elements on an outer surface of at least one of the two side walls and each configured to independently couple with the cable hanger slide-coupling element of the cable hanger, each clip slide-coupling element having a tapered cross-sectional profile in a longitudinal plane that narrows in a sliding axis towards an edge of the respective side wall and having a trapezoidal cross-sectional profile in a lateral plane that is orthogonal with the longitudinal plane, the at least two clip slide-coupling elements including:

a first clip slide-coupling element having a first longitudinal plane in a first sliding axis; and a second clip slide-coupling element having a second longitudinal plane in a second sliding axis that is at an angle with the first sliding direction.

4. The cable hanger system of claim 3, wherein:

the grip element comprises a first grip element; and the cable hanger system further comprises a second grip element.

5. The cable hanger system of claim 4, wherein:

the component retention clip further comprises at least two grip receptacles in the respective side wall coupled with the at least two grip elements; and each grip receptacle receives a retention spur of the respective grip element.

6. The cable hanger system of claim 3, wherein the at least two clip slide-coupling elements include three clip slide-coupling elements and wherein at least two of the clip slide coupling elements have a trapezoidal cross-sectional profile in the longitudinal plane.

7. The cable hanger system of claim 3, wherein the at least two clip slide-coupling elements comprise a bi-directional slide-coupling element on the outer surface of the respective wall, the bi-directional slide-coupling element having at least two trapezoidal cross-sectional profiles that each taper towards opposite edges of the respective wall.

8. The cable hanger system of claim 3, wherein:

each clip slide-coupling element is a protruding slide-coupling element that has the trapezoidal cross-sectional profile; or each clip slide-coupling element is a recess slide-coupling element that has the trapezoidal cross-sectional profile.

9. The cable hanger system of claim 3, wherein:

the body further defines a second cable retention channel adjacent and parallel to the cable retention channel;

the second cable retention channel is smaller than the cable retention channel;

the second cable retention channel is both shorter and narrower than the cable retention channel;

the second cable retention channel is configured to receive and support one or more communication cables;

the cable retention channel is configured to receive and support one or more feeder cables that are electrically coupled to one or more solar panels supported by the solar array to which the cable hanger system is coupled;

a first distance across an opening of the cable retention channel is less than a first diameter of each of the one or more feeder cables;

a second distance across an opening of the second cable retention channel is less than a second diameter of each of the one or more communication cables;

the body includes a first hook that defines the cable retention channel and a second hook that defines the second cable retention channel;

the second hook extends from the first hook;

at least one of the first hook or the second hook is resiliently deformable;

the cable retention channel is wider deeper in the cable retention channel than at an opening of the cable retention channel.

* * * * *